United States Patent
Ling et al.

(10) Patent No.: US 8,577,362 B2
(45) Date of Patent: Nov. 5, 2013

(54) SYSTEM AND METHOD FOR QUANTIFYING ANCHOR PLACEMENT IMPACT PLACEMENT ON LOCATION ACCURACY

(75) Inventors: Yibei Ling, Belle Mead, NJ (US); Richard Lau, Morganville, NJ (US); Scott Alexander, Warren, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 0 days.

(21) Appl. No.: 13/253,211

(22) Filed: Oct. 5, 2011

(65) Prior Publication Data

US 2012/0231786 A1     Sep. 13, 2012

Related U.S. Application Data

(60) Provisional application No. 61/450,839, filed on Mar. 9, 2011.

(51) Int. Cl.
 *H04W 24/00*     (2009.01)

(52) U.S. Cl.
 USPC .......................... 455/424; 455/423; 455/446

(58) Field of Classification Search
 None
 See application file for complete search history.

(56) References Cited

U.S. PATENT DOCUMENTS

| | | | |
|---|---|---|---|
| 6,587,692 | B1 | 7/2003 | Chen et al. |
| 2007/0077941 | A1 | 4/2007 | Gonia et al. |
| 2010/0265836 | A1 | 10/2010 | Lau et al. |
| 2011/0188389 | A1* | 8/2011 | Hedley et al. ............ 370/252 |

OTHER PUBLICATIONS

N. Bulusu, J. Heidemann and D. Estrin, "Adaptive Beacon Placement," 21st International Conference on Distributed Computing Systems, 2001.

K. Chen, K-S. Lui and V. Tam, "Localization in Sensor Networks with Limited Number of Anchors and Clustered Placement," Wireless Communications and Networking Conference, pp. 4428-4432, 2007.

International Application No. PCT/US2012/028180—PCT International Search Report dated Jun. 4, 2012.

* cited by examiner

*Primary Examiner* — Erika A Washington
(74) *Attorney, Agent, or Firm* — Philip J. Feig

(57) ABSTRACT

A computer implemented method for determining geometric impact of anchor placement on localization accuracy and the subset of anchors which mitigates the impact of measurement-induced noise.

7 Claims, 36 Drawing Sheets

FIG. 2
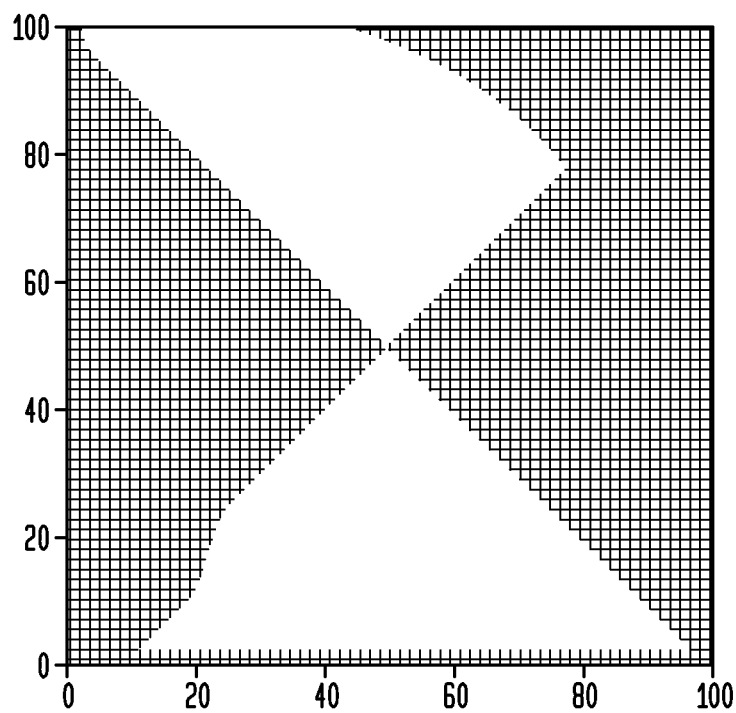
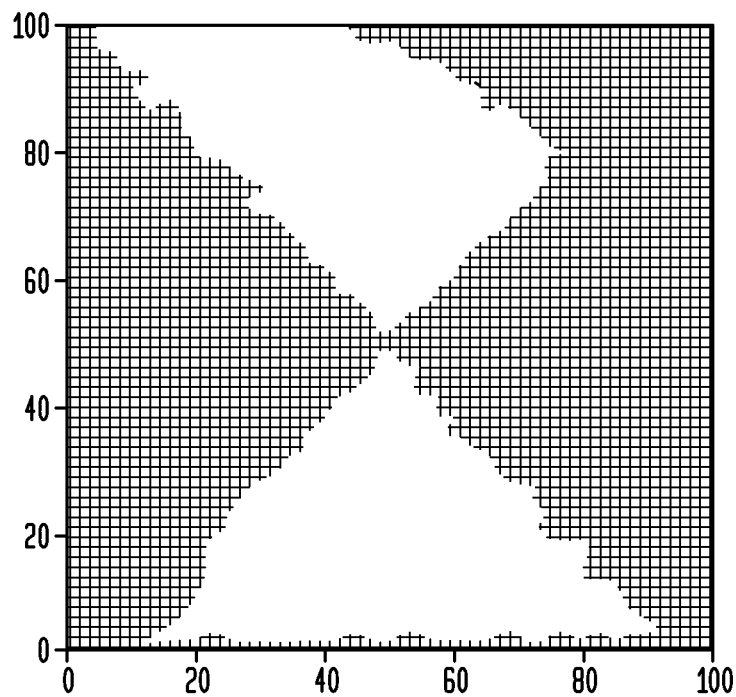

FIG. 3
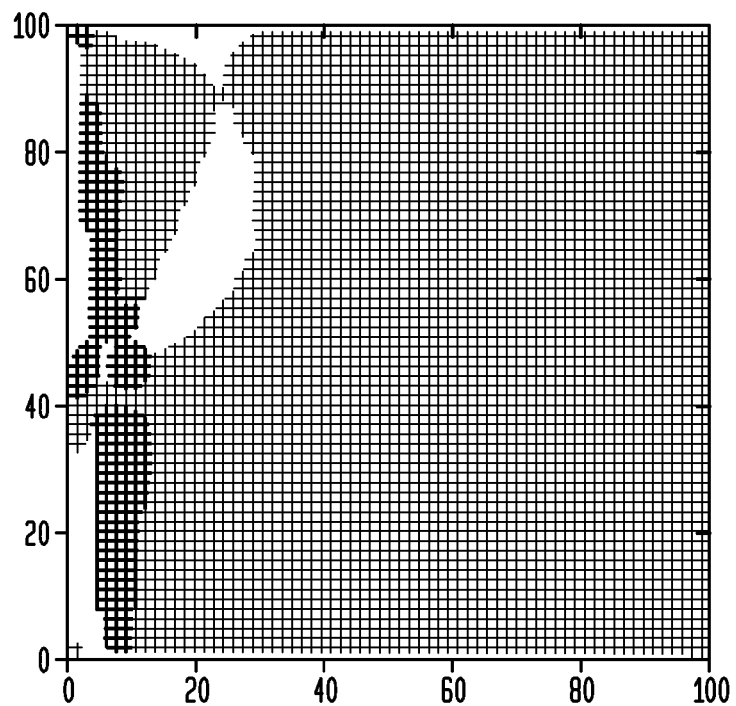
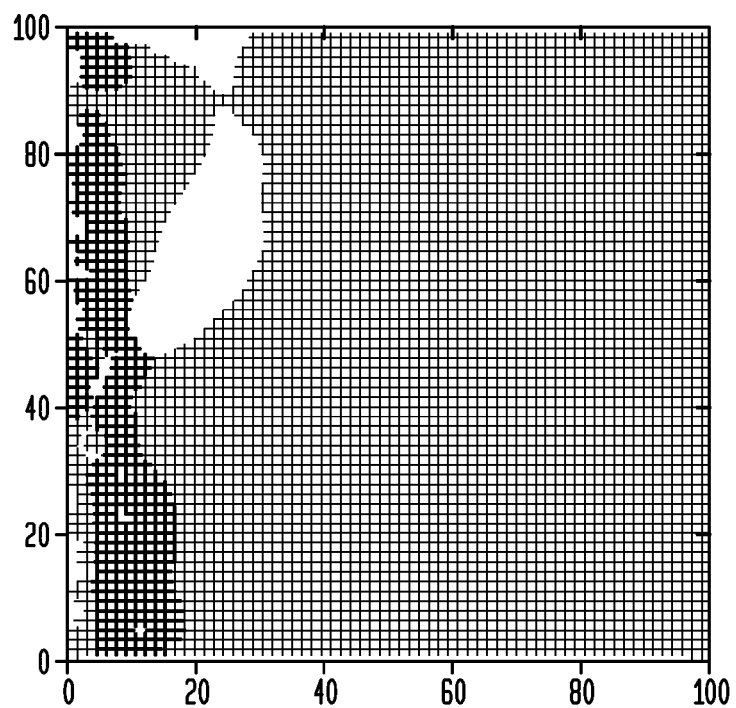

FIG. 7
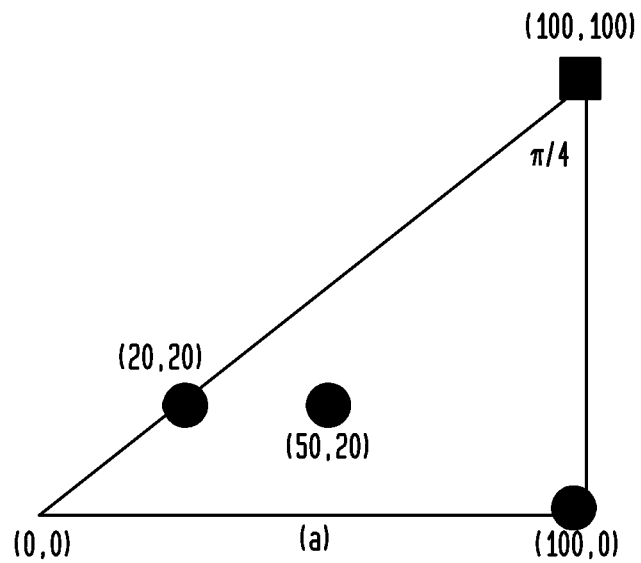
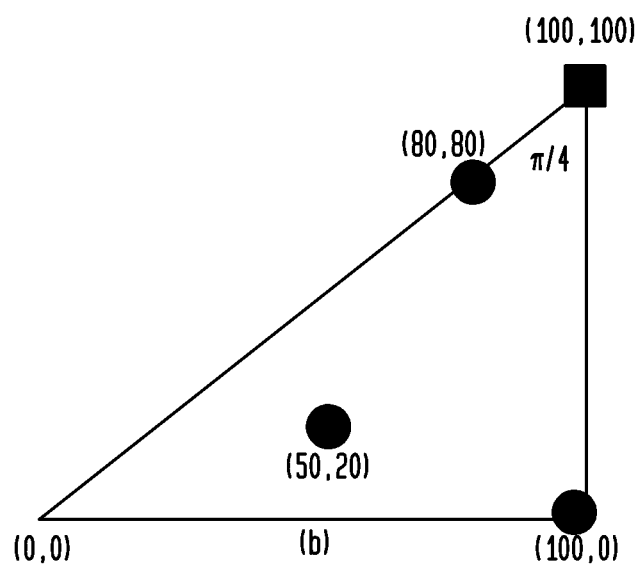

FIG. 23
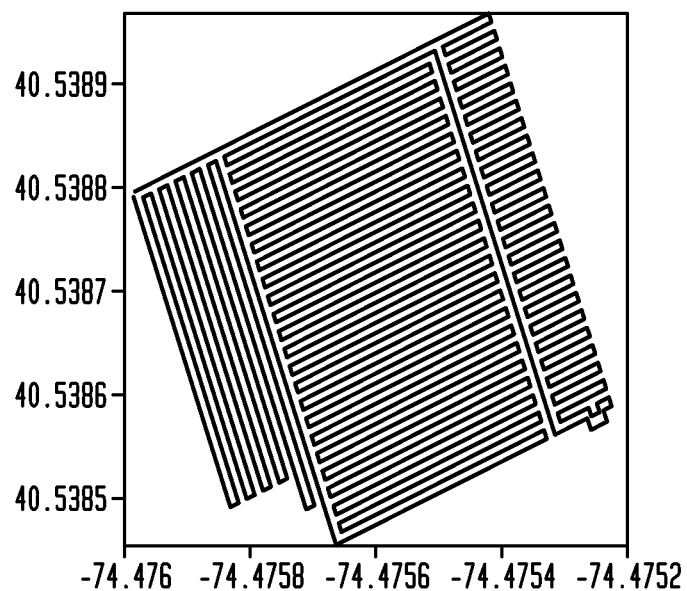
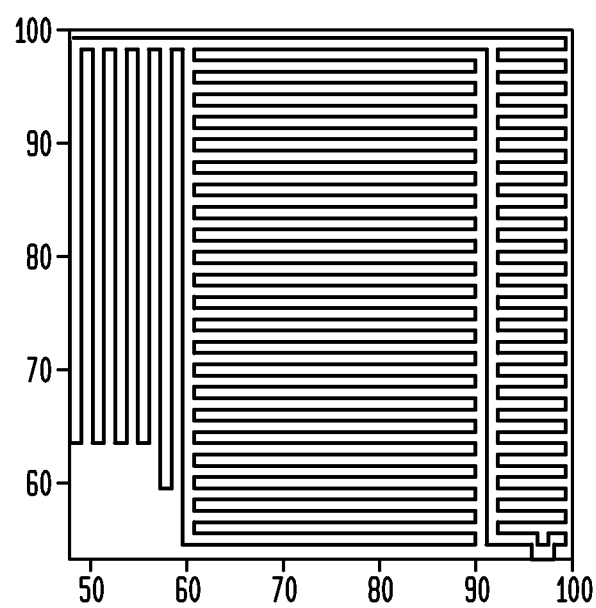

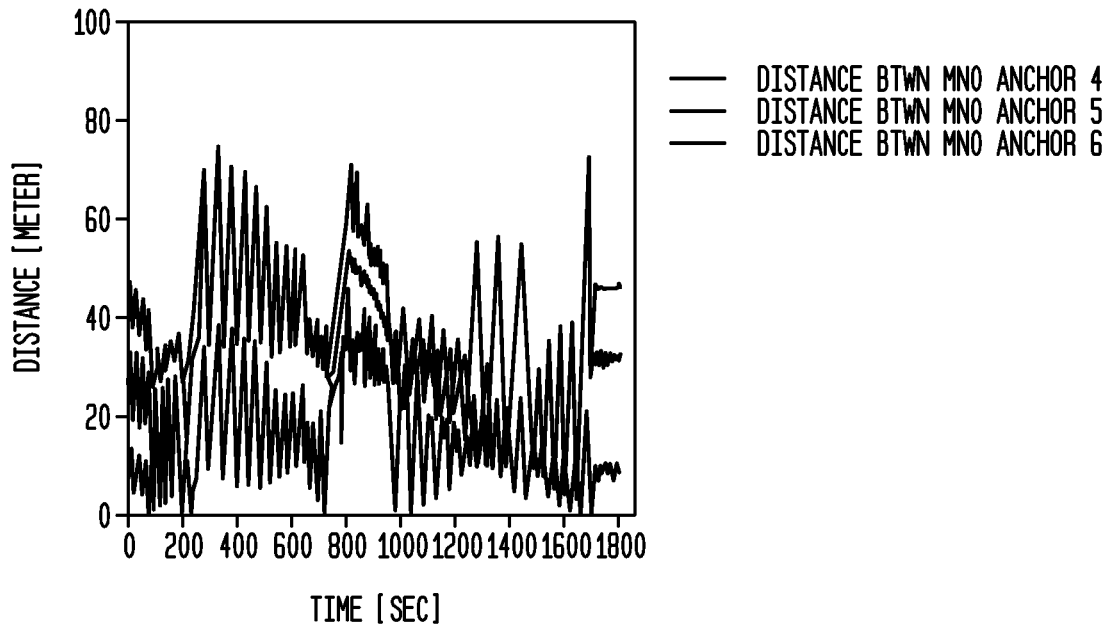
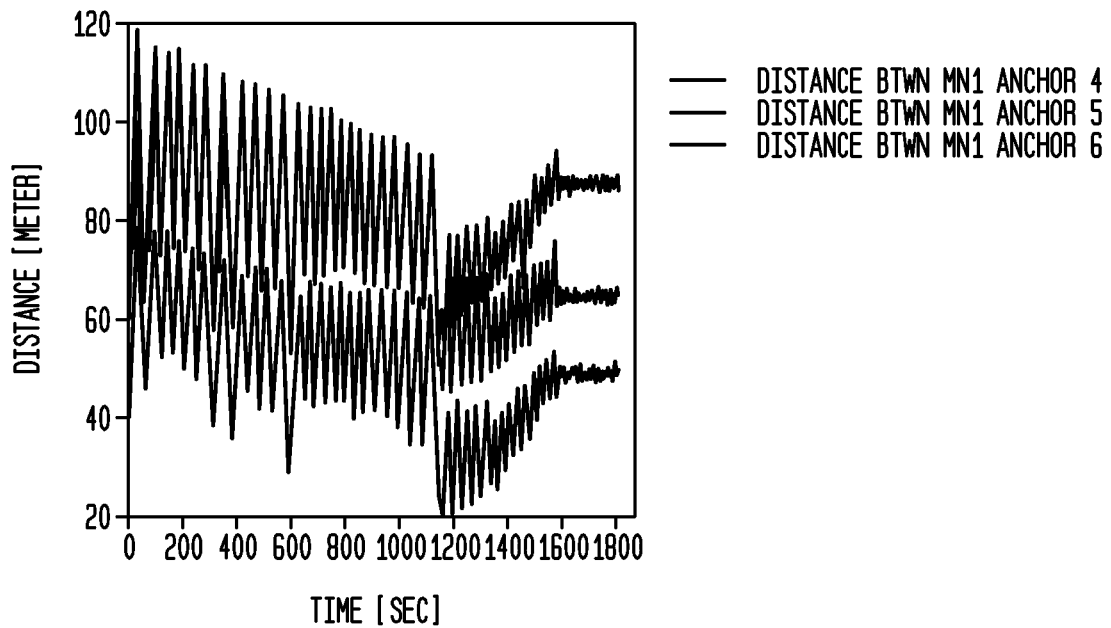

Algorithm 1 Two-phase Localization Method
---
Input: $p_i=(x_i,y_i), 1\leq i\leq m$: $i^{th}$ anchor's position
Input: $d_j$: distance measurement from $j^{th}$ anchor to MN $p$
Input: $\bar{p}=(\bar{x},\bar{y})$: a reference point obtained via LSM
 1: $g_{min} \leftarrow \infty, p_* \leftarrow (0,0), p_{**} \leftarrow (0,0)$
 2: for $i = 1$ to $m - 1$ do
 3:    for $j = i+1$ to $m$ do
 4:       if $g_{(p_i,p_j)}(p) < g_{min}$ then
 5:          $g_{min} \leftarrow g_{(p_i,p_j)}(p), (p_*,p_{**}) \leftarrow (p_i,p_j)$
 6:       end if
 7:    end for
 8: end for
 9: $d=|p_*-p_{**}|, d_*=|p-p_*|, d_{}=|p-p_{}|$
10: $\theta = \arctan \frac{y_{**}-y_*}{x_{**}-x_*}, u=\frac{d_*^2-d_{**}^2+d^2}{2d}, v=\sqrt{d_*^2-u^2}$
11: $p* = \begin{pmatrix} \cos(\theta) & -\sin(\theta) \\ \sin(\theta) & \cos(\theta) \end{pmatrix} \begin{pmatrix} u \\ v \end{pmatrix} + \begin{pmatrix} x_* \\ y_* \end{pmatrix}$
12: $p** = \begin{pmatrix} \cos(\theta) & -\sin(\theta) \\ \sin(\theta) & \cos(\theta) \end{pmatrix} \begin{pmatrix} u \\ -v \end{pmatrix} + \begin{pmatrix} x_* \\ y_* \end{pmatrix}$
13: if $|p*-\bar{p}| < |p-\bar{p}|$ then**
14:    return $p*$
15: end if
16: return $p**$

FIG. 29

TABLE 1
ANCHOR PLACEMENT & LOCALIZATION ACCURACY

| LEAST-SQUARE METHOD | | | | |
|---|---|---|---|---|
| POSITIONS OF ANCHORS | σ | AVE | STD | TIME |
| (0,100),(0,0),(100,0) | 0.3 | 0.42 | 0.26 | 2.52 |
| $\kappa(A^T,A)=9$ | 1.0 | 1.40 | 0.85 | 2.54 |
| (0,100),(7,50),(3,40) | 0.3 | 4.01 | 3.65 | 2.51 |
| $\kappa(A^T,A)=553.6$ | 1.0 | 13.45 | 12.15 | 2.57 |
| (0,100),(0,0),(100,0),(1,98) | 0.3 | 0.42 | 0.26 | 2.57 |
| $\kappa(A^T,A)=12.5$ | 1.0 | 1.40 | 0.86 | 2.59 |
| (0,100),(7,50),(3,40),(1,98) | 0.3 | 4.38 | 3.83 | 2.59 |
| $\kappa(A^T,A)=43.3$ | 1.0 | 14.59 | 12.79 | 2.58 |
| GRADIENT DESCENT METHOD | | | | |
| POSITIONS OF ANCHORS | σ | AVE | STD | TIME |
| (0,100),(0,0),(100,0) | 0.3 | 0.37 | 0.21 | 63 |
|  | 1.0 | 1.22 | 0.69 | 81 |
| (0,100),(7,50),(3,40) | 0.3 | 0.76 | 0.92 | 275 |
|  | 1.0 | 2.94 | 7.41 | 293 |
| (0,100),(0,0),(100,0),(1,98) | 0.3 | 0.33 | 0.19 | 42 |
|  | 1.0 | 1.10 | 0.64 | 56 |
| (0,100),(7,50),(3,40),(1,98) | 0.3 | 0.934 | 2.03 | 213 |
|  | 1.0 | 5.83 | 7.54 | 316 |
| GAUSSIAN NOISE $N(0,\sigma^2)$ | | | | |

FIG. 30

TABLE 2
TWO-PHASE LOCALIZATION METHOD

| POSITION OF ANCHORS | $\sigma$ | AVE | STD | TIME |
|---|---|---|---|---|
| (0,100),(0,0),(100,0) | 0.3 | 0.40 | 0.22 | 3.17 |
|  | 1.0 | 1.32 | 0.73 | 3.17 |
| (0,100),(7,50),(3,40) | 0.3 | 0.70 | 0.88 | 3.44 |
|  | 1.0 | 2.76 | 5.67 | 3.15 |
| (0,100),(0,0),(100,0),(1,98) | 0.3 | 0.40 | 0.22 | 3.25 |
|  | 1.0 | 1.33 | 0.73 | 2.99 |
| (0,100),(7,50),(3,40),(1,98) | 0.3 | 0.73 | 1.00 | 3.53 |
|  | 1.0 | 2.98 | 6.33 | 2.96 |
| GAUSSIAN NOISE $N(0,\sigma^2)$ | | | | |

FIG. 31

TABLE 3
ACCURACY DEPENDENCE OF TPLM ON OSAP AND LSM

| MOVING ANCHOR | OSAP AVE | TPLM AVE | LSM AVE | FLIP ERROR | $\kappa(A^T,A)$ |
|---|---|---|---|---|---|
| (0,0) | 1.704 | 1.704 | 5.449 | 0 | 45.56 |
| (10,10) | 1.709 | 1.709 | 7.315 | 0 | 61.56 |
| (20,20) | 1.706 | 1.706 | 13.929 | 0 | 220.03 |
| (30,30) | 1.664 | 31.321 | 74.652 | 1622 | 5776 |
| (40,40) | 1.719 | 1.719 | 8.706 | 0 | 62.02 |
| (50,50) | 1.721 | 1.721 | 4.645 | 0 | 15.47 |
| (60,60) | 1.716 | 1.716 | 3.305 | 0 | 10.71 |
| (70,70) | 1.709 | 1.709 | 2.735 | 0 | 8.59 |
| (80,80) | 1.706 | 1.706 | 2.463 | 0 | 8.023 |
| (90,90) | 1.681 | 1.689 | 2.294 | 7 | 12.01 |
| GAUSSIAN NOISE N(0,1), TWO FIXED ANCHORS AT (100,0),(50,20) | | | | | |

FIG. 32

TABLE 4
ANCHOR PLACEMENT SETUP

| ANCHOR POSITION ||||
|---|---|---|---|
| p1=(0,100), p2=(7,50),p3(0,0) ||||
| p4=(3,40), p5=(100,0),p6(1,98) ||||
| ANCHOR PLACEMENT SETUPS ||||
| $AP_1$ | (0,100),(0,0),(100,0) |||
| $AP_2$ | (0,100),(7,50),(3,40) |||
| $AP_3$ | (0,100),(0,0),(100,0),(1,98) |||
| $AP_4$ | (0,100),(7,50),(3,40),(1,98) |||
| $\Omega$:100 x 100 REGION | | $\Gamma$:HILBERT CURVE ||
| ANCHOR PLACEMENT IMPACT OVER $\Omega$ ||||
| $(G(AP_1,\Omega)$ | $(G(AP_2,\Omega)$ | $(G(AP_3,\Omega)$ | $(G(AP_4,\Omega)$ |
| 1.501 | 2.615 | 1.498 | 2.594 |
| ANCHOR PLACEMENT IMPACT OVER $\Gamma$ ||||
| $(G(AP_1,\Gamma)$ | $(G(AP_2,\Gamma)$ | $(G(AP_3,\Gamma)$ | $(G(AP_4,\Gamma)$ |
| 1.499 | 2.688 | 1.496 | 2.622 |

FIG. 33

TABLE 5
RANDOM ANCHOR PLACEMENT

| ANCHORS | $\overline{G(AP,\Gamma)}$ | TPLM | | LSM | | GDM | |
|---|---|---|---|---|---|---|---|
| | | AVE | STD | AVE | STD | AVE | STD |
| RANDOM AND UNIFORM ANCHOR DISTRIBUTION IN THE TRAVERSAL AREA | | | | | | | |
| 3 | 2.05 | 0.57 | 0.67 | 1.52 | 1.26 | 0.87 | 0.86 |
| 4 | 1.69 | 0.44 | 0.31 | 0.79 | 0.59 | 0.49 | 0.39 |
| 5 | 1.53 | 0.40 | 0.24 | 0.59 | 0.42 | 0.38 | 0.27 |
| 6 | 1.48 | 0.39 | 0.21 | 0.51 | 0.35 | 0.33 | 0.22 |
| RANDOM AND UNIFORM ANCHOR DISTRIBUTION IN THE HALF TRAVERSAL AREA | | | | | | | |
| ANCHORS | $\overline{G(AP,\Gamma)}$ | TPLM | | LSM | | GDM | |
| | | AVE | STD | AVE | STD | AVE | STD |
| 3 | 2.72 | 0.97 | 1.61 | 2.82 | 2.48 | 1.54 | 1.74 |
| 4 | 1.93 | 0.52 | 0.52 | 1.37 | 1.12 | 0.69 | 0.66 |
| 5 | 1.77 | 0.46 | 0.31 | 0.81 | 0.61 | 0.46 | 0.36 |
| 6 | 1.69 | 0.44 | 0.28 | 0.72 | 0.54 | 0.40 | 0.31 |

FIG. 34

TABLE 6
FIELD TESTBED AREA AND ANCHOR PLACEMENT

| $x'_0$ | $y'_0$ | $x_f$ | $y_f$ | $\alpha$ |
|---|---|---|---|---|
| -74.476069 | 40.537808 | 84719 | 111045 | 0.381583 |
| ANCHOR PLACEMENT || || |
| GPS POSITION || TRANSFORMED POSITION |||
| -74.475585 | 40.5838468 | p4=(65.345179,52.75145) |||
| -74.475287 | 40.53856 | p5=(92.580022,52.83239) |||
| -74.475186 | 40.538294 | p6=(89.52274,22.232383) |||

FIG. 35

TABLE 7
g(p4,p5,p6) (Γ) OF TRAJECTORIES IN FIELD TESTBED

| g3(p4,p5,p6) (Γ$_0$) | g3(p4,p5,p6) (Γ$_1$) |
|---|---|
| 1.667025 | 1.967605 |
| g3(p4,p5,p6) (Γ$_2$) | g3(p4,p5,p6) (Γ$_3$) |
| 1.787370 | 1.835048 |

SYSTEM AND METHOD FOR QUANTIFYING ANCHOR PLACEMENT IMPACT PLACEMENT ON LOCATION ACCURACY

CROSS-REFERENCE TO RELATED APPLICATIONS

This application claims the benefit of U.S. Provisional Application No. 61/450,839 filed on Mar. 9, 2011, which is incorporated by reference herein in its entirety.

FIELD OF THE INVENTION

This invention relates generally to the field of telecommunications and in particular to a system and method for quantifying geometric impact of anchor placement on localization accuracy over a traversal area.

BACKGROUND OF THE INVENTION

Problems associated with ability to accurately localize mobile nodes in a traversal area remain among the most interesting and difficult in telecommunications research. Accordingly, methods and/or techniques that facilitate the ability to determine the position of a mobile node would represent a significant advance in the art.

BRIEF SUMMARY OF THE INVENTION

An advance is made in the art according to an aspect of the present invention directed to a computer implemented method for quantifying geometric impact of anchor placement on localization accuracy over a traversal area.

In sharp contrast to the prior art which generally employed least-square or gradient descent (non-linear optimization) methods, a method according to an aspect of the present disclosure exhibits the ability to choose a pair of anchors among many alternatives, thereby advantageously mitigating any impact of measurement noise on localization accuracy.

BRIEF DESCRIPTION OF THE DRAWINGS

A more complete understanding of the present disclosure may be realized by reference to the accompanying drawings in which:

FIG. 2 shows noise free and noise level sigma;

FIG. 3 shows noise free and noise level sigma;

FIG. 7** shows three anchor placements with same minimum anchor pair GDOP value;

FIG. 23 is a graph showing raw GPS and trajectories;

FIG. 28 is a pseudocode listing of ALGORITHM 1 according to an aspect of the present disclosure;

FIG. 29 is a table (TABLE 1) showing anchor placement and localization accuracy data according to an aspect of the present disclosure;

FIG. 30 is a table (TABLE 2) showing two-phase localization method data according to an aspect of the present disclosure;

FIG. 31 is a table (TABLE 3) showing accuracy dependence data of TPL on OSAP and LSM according to an aspect of the present disclosure;

FIG. 32 is a table (TABLE 4) showing anchor placement setup data according to an aspect of the present disclosure;

FIG. 33 is a table (TABLE 5) showing random anchor placement data according to an aspect of the present disclosure;

FIG. 34 is a table (TABLE 6) showing field testbed area data according to an aspect of the present disclosure; and FIG. 35 is a table (TABLE 7) showing trajectory data in field testbed according to an aspect of the present disclosure.

DETAILED DESCRIPTION

Figure 1:
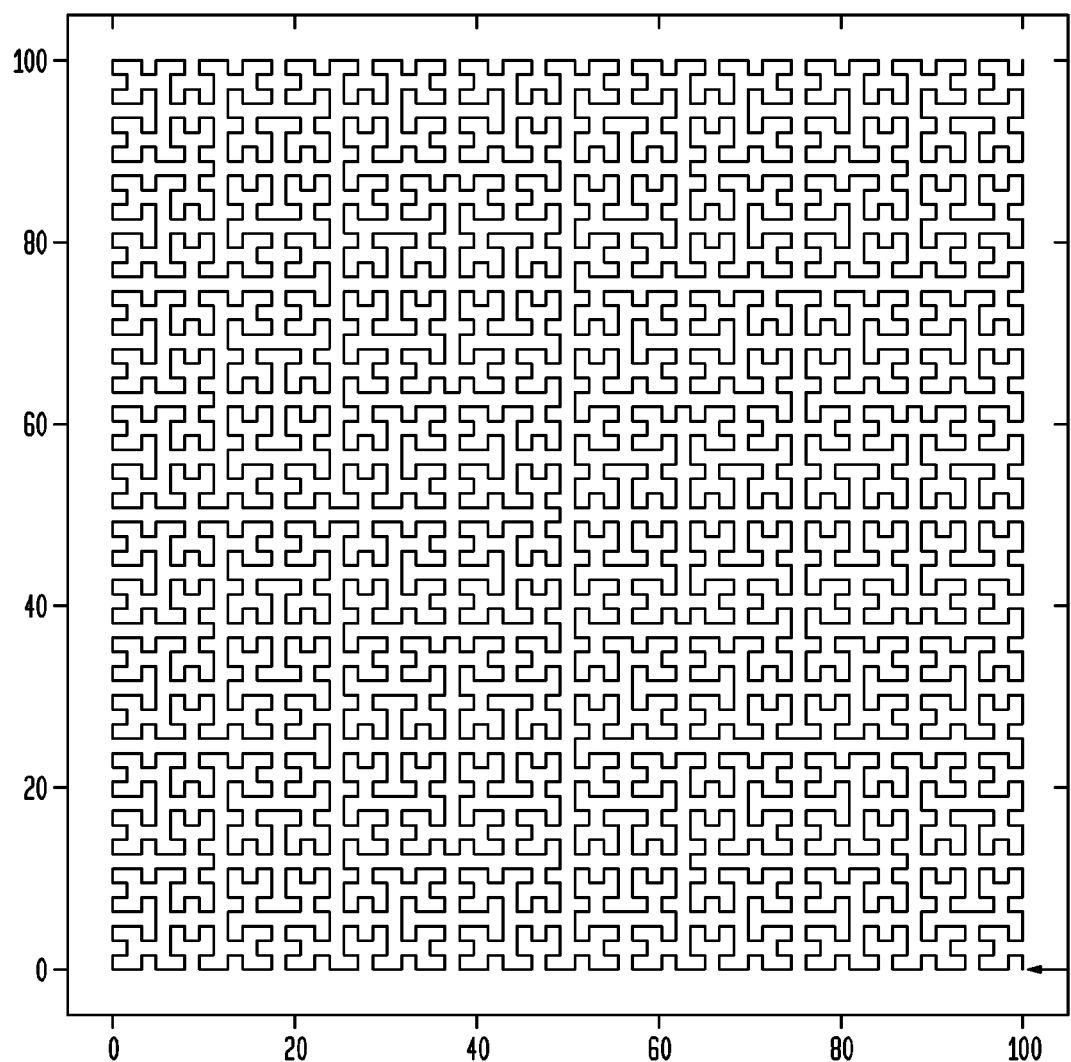
FIG. 1 shows a Hilbert Curve Transversal.
Figure 4:
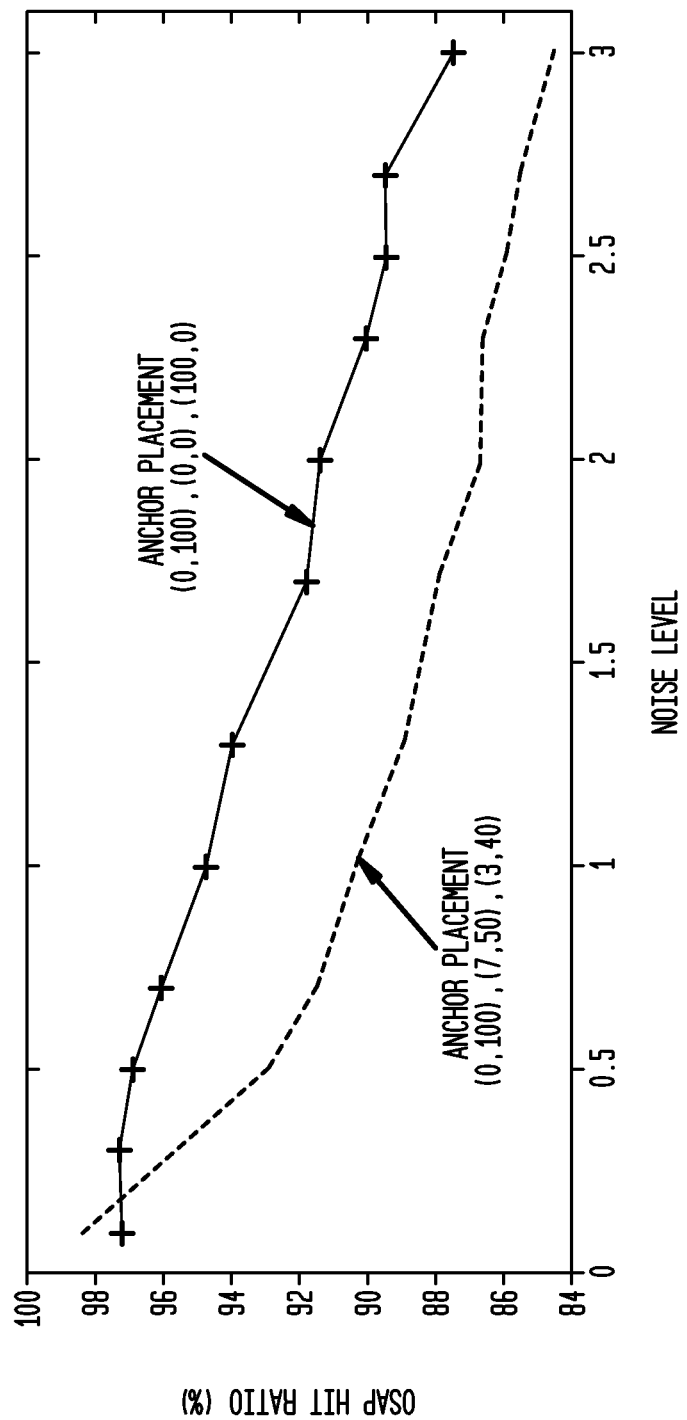
FIG. 4 is a plot of average OSAP hit ratio of two AP setups as a function of noise level over HCT.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function.

The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Introduction

By way of some additional background it is noted that accurate localization is essential for a wide range of applications including mobile ad hoc networking, cognitive radio and robotics. Advantageously, accurate localization may enable position-aware channel scheduling for reducing communication interferences, and is indispensable in cognitive and software-defined radio (SDR) for capturing temporal-spatial radio characteristics and enabling dynamic alteration of radio transmission or reception parameters to minimize the adverse interference impact(s).

Contemporary research efforts on localization have generally proceeded along two distinct—yet closely related tracks namely, (1) measurement technologies; and (2) localization algorithms.

Generally speaking, measurement technologies may be conveniently grouped into three categories namely, (a) Received-Signal-Strength (RSS) based, (b) Time Of Arrival (TOA) based, and (c) Angle of Arrival (AoA) based, which—in turn—uses either RSS-based or TOA-based measurements.

RSS-based technologies are popular due—in part—to the relative ubiquity of WiFi and cellular networks. For instance, Google provides a set of geolocation APIs that allows a network server to determine a client's position using RSS of cell towers or WiFi base stations. One principle underlying RSS-based approaches is the translation of RSS into distance estimates. While experimental results in tightly controlled lab environments have appeared to be promising, empirical studies of RSS measurements have shown that RF radio has a non-isotropic property in most environments, which may be due to shadowing and multipath effects. Thus the performance of RSS-based measurements are environmentally dependent.

TOA-based technologies such as Ultra Wideband radio (UWB) and Global Positioning (GPS) measures the propagation-induced time delay between a transmitter and a receiver. The hallmark of TOA-based technologies is the receiver's ability to accurately determine an arrival time of line-of-sight (LOS) signals. TOA-based approaches typically out-perform RSS-based ones in both ranging accuracy and reliability. In particular, UWB-based ranging technologies appear to be promising for indoor positioning as UWB signal can penetrate common building materials.

AoA-based technologies measure angles of the target node perceived by anchors by means of an antenna array using either RRS or TOA measurement. Since AoA-based approaches are required to have multiple antennas, which increases cost and size of a device.

Those skilled in the art will readily appreciate that one particularly acute problem associated with determining localization is that has many variants that reflect the diversity of operational environments encountered in practice. In particular—in open areas—GPS has been considered to be the localization choice. Despite its ubiquity and popularity however, GPS has a significant drawback which limits its application scope under certain circumstances namely, GPS typically does not work in indoor environments. Moreover, the power consumption of GPS receiver is a major hindrance that precludes GPS application in resource-constrained sensor networks.

To overcome the limitations of GPS technologies, acoustic/radio-strength and Ultra-wideband (UWB) ranging technologies have been proposed. Rapid advances in IC fabrication and RF technologies make possible the deployment of large scale power-efficient sensor networks, but at the same time present a new set of localization problems.

The network localization problem, which by nature is NP-hard, arises naturally from the need to locate nodes in large sensor networks. As may be appreciated, the goal is to locate all nodes in the network in which only a small number of nodes (anchors) know their precise positions initially. The network localization is performed in an incremental fashion: a sensor node (with initially unknown position) measures its distances to three anchors, and then determines its position. Once the position of a node is determined, then the node becomes a new anchor.

The network localization faces two major challenges: 1) cascading error accumulation and 2) insufficient number of initial anchors and initial skewed anchor distribution. To deal with the first—error accumulation challenge—one can utilize optimization techniques to smooth out error distribution. To deal with the second initial anchor challenge—one can adopt multihop ranging estimation to anchor nodes. Known optimization techniques for solving network localization include semidefinite programming as described by So and Ye (See, A. M. So and Y. Ye, THEORY OF SEMIDEFINITE PROGRAMMING FOR SENSOR NETWORK LOCALIZATION, SODA, 2005) and second order cone programming (SOCP) relaxation as described by Tseng (See, P. Tseng, SECOND-ORDER CONE PROGRAMMING RELAXATION OF SENSOR NETWORK LOCALIZATION, SIAM, J. Optim, 18, 2007). They typically outperform local (distributed) counterparts, but they are centralized solutions.

Local optimization techniques are realistic in practical settings as they use locally obtained range information. But local optimization may induce flip ambiguity that results in a significant departure from the ground truth. To deal with flip ambiguity, Eren et. al. (T. Eren, D. K. Goldenberg, W. Whiteley, Y. R. Yang, A. S. Morse, D. O. Anderson, and P. N. Belhumeur, RIGIDITY, COMPUTATION, AND RANDOMIZATION IN NETWORK LOCALIZATION, In INFOCOM, pages 2673-2684, March, 2004) applied graph rigidity theory to establish the condition of unique network localizability. They showed that a network can be uniquely localizable if its grounded graph is globally rigid. By exploiting the rigidity of a quadrilateral, the robust quadrilaterals algorithm by Moore et al. (D. Moore, J. Leonard, D. Rus, and S. Teller, ROBUST DISTRIBUTED NETWORK LOCALIZATION WITH NOISY RANGE MEASUREMENTS, Proceeding of SenSys'04, November 2004) achieves the network localizability by gluing locally obtained quadrilaterals, thus effectively reducing the likelihood of flip ambiguities. Kannan et. al. (See, A. Kannan, B. Fidan, and G. Mao, DERIVATION OF FLIP AMBIGUITY PROBABILITIES TO FACILITATE ROBUST SENSOR NETWORK LOCALIZATION, IEEE Wireless Communications and Networking Conference, 2009; A. Kannan, B. Fidan, and G. Mao, ANALYSIS OF FLIP AMBIGUITIES FOR ROBUST SENSOR NETWORK LOCALIZATION, IEEE Trans on Vehicular Technology, 59(4), 2010) formulate flip ambiguity problem to facilitate robust sensor network localization.

Lederer et. al. (See, S. Lederer, Y. Wang, and J. Gao, CONNECTIVITY-BASED LOCALIZATION OF LARGE SCALE SENSOR NETWORKS WITH COMPLEX SHAPE, INFOCOM, May 2008; S. Lederer, Y. Yang, and J. Gao, CONNECTIVITY-BASED LOCALIZATION OF LARGE SCALE SENSOR NETWORKS WITH COMPLEX SHAPE, ACM Trans on Sensor Networks, 5(4), November 2009) and Priyantha et al. (See, N. B. Priyantha, H. Balakrishnan, E. Demaine, and S. Teller, ANCHOR-FREE DISTRIBUTED LOCALIZATION IN SENSOR NETWORKS, Tech Report #892, MIT Laboratory for Computer Science, April 2003) describe methods that involve anchor-free localization problem in which none of the nodes know their positions. The goal is to locate a large network with a complex global layout, by using only the network connectivity. They develop an algorithm for constructing a globally rigid Delaunay complex for localization of a large sensor network with complex shape.

Bruck, Gao and Jiang (See, J. Bruck, J. Gao, and A. Jiang, LOCALIZATION AND ROUTING IN SENSOR NETWORK BY LOCAL ANGLE INFORMATION, ACM Trans. On Sensor Networks, 5(1), February 2009) describe the condition of network localization using the connectivity with local angle information. One thing they show that embedding a unit disk graph is NP-hard even when the angles between adjacent edges are given. But, using only local angle information one can extract the restricted Delaunay graph.

Patwari et al (N. Patwari, J. N. Ash, S. Kyperountas, A. O. Hero III, R. L. Moses, and N. S. Correal, LOCATING THE NODES: COOPERATIVE LOCALIZATION IN WIRELESS SENSOR NETWORKS, IEEE Signal Process. Mag, 22(4), 2005) used the Cramer-Rao bound (CRB) to establish performance bounds for localizing stationary nodes in sensor networks under different path-loss exponents. Dulman et. al. (See, S. O. Dulman, A. Baggio, P. J. M. Havinga, and K. G. Langendoen, A GEOMETRICAL PERSPECTIVE ON LOCALIZATION, In 14$^{th}$ Annual International Conference on Mobile Computing and Networking, 2008) propose a novel iteration algorithm for the placement of three anchors for a given set of stationary nodes: during each iteration, the new position of one chosen anchor is computed according to the noise-resilience metric. Bishop et. al. (See, A. N. Bishop, B. Fidan, B. D. O Anderson, K. Dogancay, and N. Pathirana, OPTIMALITY ANALYSIS OF SENSOR-TARGET GEOMETRIES IN PASSIVE LOCATION: PART 1—BEARING-ONLY LOCALIZATION, ISSNIP, September 2007; A. N. Bishop, B. Fidan, B. D. O Anderson, K. Dogancay, and N. Pathirana, OPTIMALITY ANALYSIS OF SENSOR-TARGET LOCALIZATION GEOMETRIES, Automatic, 46(3), 2010; A. N. Bishop, and P. Jensfelt, OPTIMALITY ANALYSIS OF SENSOR-TARGET GEOMETRIES IN PASSIVE LOCATION: PART 2 TIME-OF-ARRIVAL BASED LOCALIZATION, ISSNIP September 2007; A. N. Bishop and P. Jensfelt, AN OPTIMALITY ANALYSIS OF SENSOR TARGET GEOMETRIES FOR SIGNAL STRENGTH LOCALIZATION, ISSNIP, September, 2009) studied the geometric impact of anchor placement with respect to one stationary node. By using the Cramer-Rao bound, they present a rigorous analysis of the geometric impacts under RSS-based, angle-based and TOA-based measurement technologies.

Bulusu et. al. has proposed an adaptive anchor placement methods (See, N. Bulusu, J. Heidemann, and D. Estrin, ADAPTIVE BEACON PLACEMENT, The 21$^{st}$ International Conference on Distributed Computing Systems, April 2001), and evaluated the efficacy of the methods through extensive simulations. Based on actual localization error at different places in the region, their algorithm can empirically determine good places to deploy additional anchors. Their approach, however, exhibit several drawbacks namely, 1) obtaining localization error at different places in the region in actual application environments may be cumbersome and hard mainly because it requires baseline measurement using a more accurate ranging technology; and 2) empirically determined places for measuring localization error could affect the placement for new anchors.

One aspect of the present disclosure then addresses the problem of accurately locating mobile nodes in a traversal area, and answers two questions: (1) for a given traversal area and an anchor placement, how to quantify the geometric impact of an anchor placement on localization accuracy; and (2) how to optimally select a subset of anchors to effectively mitigate the impact of measurement-induced noise.

One focus of our effort then is the accurate localization of mobile nodes and the impact quantification of an anchor placement over a traversal area, rather than network layout restoration in network localization.

Prior to this work, we are aware of only a few reports describing geometric effect of anchor placement. The one(s) that do, seem to do so in a different context that us however. Accordingly, one aspect of the present disclosure—quantifying the geometric impact of anchor placement on localization accuracy over a traversal area—has not been satisfactorily addressed.

Effect of Anchor Placement

As used herein, the term "anchor" denotes a node with known position. Conveniently, we adopt a widely used assumption that the positions of anchors are available to each mobile node (MN hereafter) and that the noise between any anchors and any MN is statistically identical to each other. One goal is to establish the position of a MN through ranging measurements to available anchors.

It is understood that in practice localization accuracy is influenced by measurement noise. To study the geometric effect of an anchor placement, we formulate the problem as follows: Let $p_i=(x_i,y_i)$, $(1 \leq i \leq m)$ denote the position of the $i^{th}$ anchor, and p the actual position of the MN of interest. The distance between p and $p_i$ is thus expressed as $d_i=d(p,p_i)=\sqrt{(x-x_i)^2+(y-y_i)^2}$. In practical terms, the obtained distance measurement is affected by both the intrinsic noise of the device and extrinsic noise such as multipath interference. Thus the obtained distance measurement is written as $\tilde{d}=d_i+\epsilon_i$ where $d_i$ the actual distance, and $\epsilon_i$ is often assumed to be a Gaussian noise with zero mean and variance $\sigma_i^2$. To simplify analysis, we further assume that $\sigma_i=\sigma_j$, $i \neq j$.

We define a function $$f(x,y) = \sum_{i=1}^{m} \left((x-x_i)^2 + (y-y_i)^2 - \tilde{d}_i^2\right)^2,$$

where $p_i=(x_i,y_i)$ denotes the known position of the $i^{th}$ accessible anchor, and $\tilde{d}_i$ noisy distance measurement between the $i^{th}$ anchor and the MN. The localization problem can be stated simply as:

$$\min_{(x,y) \in \mathfrak{R}^2} f(x,y), \mathfrak{R} \text{ is the real number set.} \quad (1)$$

As may be appreciated, this is a nonlinear optimization problem, which can be calculated by a number of algorithms such as the gradient descent method. In this paper we employ a known, Gradient Descent Method (hereinafter GDM) for its simplicity and stability. GDM is based on an intuitive notion that if a function $f(x^{(o)}, y^{(o)})$ is differentiable in the vicinity of $(x^{(o)}, y^{(o)})$, then $f((x^{(o)}, y^{(o)})$ decreases fastest in the direction of the negative gradient $-\nabla f(x^{(o)}, y^{(o)})$.

$$\begin{pmatrix} x^{(i+1)} \\ y^{(i+1)} \end{pmatrix} = \begin{pmatrix} x^{(i)} \\ y^{(i)} \end{pmatrix} - \eta \begin{pmatrix} \frac{\partial f(x,y)}{\partial x} \\ \frac{\partial f(x,y)}{\partial y} \end{pmatrix}, \quad (2)$$

We define a function where $\eta$ refers to the iteration step size, which is chosen to ensure that $f(x^{(i+1)}, y^{(i+1)}) \leq f(x^{(i)}, y^{(i)})$ where i denotes the ith iterations. Operationally, one starts with an initial value $(x^{(o)}, y^{(o)})$, then applies ((2)) iteratively to reach a local minimum $(\hat{x}, \hat{y})$, i.e., $f(\hat{x}, \hat{y}) \leq f(x^{(i)}, y^{(i)})$, $1 \leq i \leq n$.

There are three distinct but related issues associated with GDM: 1) initial value; 2) iteration step size and 3) convergence rate. As may be appreiczted, the convergence rate may be sensitive to the initial value as well as the iteration step size. While—in general—there is no theoretical guidance for selecting the initial value in practice, the value obtained by a linearized method is often chosen heuristically as the initial value. This nonlinear optimization problem in (1) can be linearized by the least-square method as follows:

$$(A^T A) \begin{pmatrix} x^{(0)} \\ y^{(0)} \end{pmatrix} = A^T M, \text{ where} \quad (3)$$

$$A = 2 \begin{pmatrix} (x_2-x_1) & (y_2-y_1) \\ (x_3-x_1) & (y_3-y_1) \\ \ldots & \ldots \\ (x_m-x_1) & (y_m-y_1) \end{pmatrix}, \quad (4)$$

$$M = \begin{pmatrix} \tilde{d}_1^2 - \tilde{d}_2^2 + r_2^2 - r_1^2 \\ \tilde{d}_1^2 - \tilde{d}_3^2 + r_3^2 - r_1^2 \\ \ldots \\ \tilde{d}_1^2 - \tilde{d}_m^2 + r_m^2 - r_1^2 \end{pmatrix}. \quad (5)$$

where $A^T$ is the transpose of A, $(A^T A)^{-1}$ is the inverse of $(A^T A)$, and $r_i = \sqrt{x_i^2 + y_i^2}$, $1 \leq i \leq m$. The least-square method (LSM hereafter) uses noisy distance measurements from accessible anchors to derive an approximated position $(x^{(o)}, y^{(o)})$, which will be used as an initial value for GDM.

One question arises however, namely how sensitive is the solution to noise? This question, to some degree, is related to the condition of a matrix in the left-hand side of ((3)). Letting $T = A^T A$. Then the extent of noise sensitivity is expressed in terms of the condition number $\kappa(T) = \|T\| \cdot \|T^{-1}\|$ where $\|T\|$ refer to the norm of the matrix T. The row sum norm is defined as $$\|T\|_\infty = \max_{1 \leq i \leq n} \sum_{j=1}^{n} |t_{ij}| \quad (6)$$

Matrix T is considered to be ill-conditioned if $\kappa(T)$ is large, and T is considered to be well-conditioned if $\kappa(T)$ is small. An ill-conditioned T implies that the solution is highly sensitive to noise, while a well-conditioned T indicates that the solution to is less sensitive to noise. Examining ((4)) shows that an ill-conditioned $T = A^T A$ exactly corresponds to a colinear anchor condition. This provides a key insight into the relationship between localization performance and anchor placement (geometry).

To illuminate some fundamental localization issues, we consider a Hilbert traversal trajectory with different AP setups in Table 1. The Hilbert traversal trajectory is formed by the piecewise connection of 8190 points in an 100×100 region (see FIG. 1)). One reason for choosing a Hilbert curve is to exploit its space-filling property, so that localization performance obtained on this curve can well represent that of the area. In addition, the Hilbert curve possesses a nice locality-preserving property that allows one better visualize the impact of anchor placement.

Starting from the upper-left corner, the MN moves along the Hilbert trajectory. At each point p (the position of MN), noise distance measurements $\tilde{d}_i = d_i + \epsilon_i$ from p to a set of anchors are generated. Both LSM and GDM are then used to derive the estimated position.

To avoid artifacts, for a given AP and noise level, the localization error statistics in Table 1 are obtained by traversing the Hilbert trajectory 10 times. Each traversal involves the establishment of 8190 positions using both LSM and GDM. Notice that GDM uses the estimated position derived from LSM as its iteration initial value, with a step size of 0.00001. The termination condition of GDM is set as $\|p^{(i+1)} - p^{(i)}\|_2 < 0.001$ and the maximum number of iterations is set as 100.

With reference to Table 1, it is noted that the ave and std fields denote average localization error and standard deviation, and the time field the elapsed time per Hilbert curve traversal (seconds). Table 1 shows that GDM outperforms LSM by huge margins but at the expense of computational overhead. For example, with AP (0,100),(0,0),(100,0) and the noise level of $\sigma=0.3$, LSM takes 2.52 seconds for a Hilbert curve traversal (HCT hereafter) and has an average error of 0.42, while GDM takes 63 seconds and has an average error of 0.366. Two observations can be made by inspecting Table 1: (1) an anchor placement (AP) has a significant bearing on localization accuracy over a traversal area; (2) the addition of one anchor does not necessarily correlate with localization improvement. For example, with the noise level of $\sigma=1$, GDM turns out to be less accuracy under AP (0,100),(7,50),(3,40),(1,98) than under (0,100),(7,50),(3,40).

The first observation raises a fundamental question: can we quantify the impact of an anchor placement (AP) with respect to a traversal area? The second one reveals a counterintuitive less-is-more phenomenon: using a subset of accessible anchors might outperform using the total set of anchors in localization accuracy and reliability. One additional aspect of the present disclosure then is to answer the above-mentioned question and provides a mathematical basis for optimal selection of a subset of accessible anchors that can effectively mitigate the impact of measurement-induced noise.

Two Phase Localization Method

We now present a theoretical framework for minimizing the noise-induced impact on localization accuracy, with one goal to minimize the noise-induced impact. One device utilized in this framework is one based on the notion of the geometric dilution of precision (GDOP). We will introduce an anchor pair GDOP function to quantify the geometric effect of an AP as follows.

Theorem 1 Let $p_i$ and $p_j$ be the positions of anchor pair i and j, and $d_i$ and $d_j$ be the distances from MN at p to the anchors i,j, then the geometric dilution of precision of p with respect to $p_i$ and $p_j$ is $$g(p_i, p_j)(p) = \sqrt{\frac{2}{1 - \left(\frac{d_i^2 + d_j^2 - \|p_i - p_j\|^2}{2d_i d_j}\right)^2}}, \quad (7)$$

where $\|p_i - p_j\|$ is the distance between $p_i$ and $p_j$.

Proof Let $h(p_i, p_j)(p)$ be a matrix defined as $$h(p_i, p_j)(p) = \begin{pmatrix} \sin(\alpha) & \cos(\alpha) \\ \sin(\beta) & \cos(\beta) \end{pmatrix} \quad (8)$$

$$= \begin{pmatrix} \frac{(x - x_i)}{\sqrt{(x - x_i)^2 + (y - y_i)^2}}, & \frac{(y - y_i)}{\sqrt{(x - x_i)^2 + (y - y_i)^2}} \\ \frac{(x - x_j)}{\sqrt{(x - x_j)^2 + (y - y_j)^2}}, & \frac{(y - y_j)}{\sqrt{(x - x_j)^2 + (y - y_j)^2}} \end{pmatrix},$$

where $(\sin(\alpha), \cos(\alpha))$ and $(\sin(\beta), \cos(\beta))$ denote the direction cosines from $p=(x,y)$ to anchors at $p_i=(x_i,y_i)$ and $p_j=(x_j, y_j)$, respectively.

Based on the work of Lee (See H. B. Lee, A NOVEL PROCEDURE FOR ASSESSING THE ACCURACY OF MULTILATERATION SYSTEMS, IEEE Trans. On Aerospace and Electronic Systems, AES-11, January 1975), the geometric dilution of precision function $g(p_i,p_j)(p)$ is written as $$g(p_i,p_j)(p) = \sqrt{tr((h^T h)^{-1})}, \quad (9)$$

where T/tr denotes the transpose/trace of a matrix, and superscript −1 refers to the inversion of a matrix.

$$(h^T h)^{-1} = \frac{\begin{pmatrix} \cos^2(\beta) + \cos^2(\alpha) & -\frac{\sin(2\beta) + \sin(2\alpha)}{2} \\ -\frac{\sin(2\beta) + \sin(2\alpha)}{2} & \sin^2(\beta) + \sin^2(\alpha) \end{pmatrix}}{\det(h^T h)}, \quad (10)$$

where det denotes the determinant of matrix. A simple manipulation obtains $\det(h^T h) = \sin^2(\beta - \alpha)$ and $$g(p_i, p_j)(p) = \sqrt{tr((h^T h)^{-1})} = \sqrt{\frac{2}{\sin^2(\beta - \alpha)}}. \quad (11)$$

Substituting $$\sin^2(\beta - \alpha) = 1 - \left(\frac{d_i^2 + d_j^2 - \|p_i - p_j\|^2}{2d_i d_j}\right)^2$$

into (11) yields (7).

Theorem 1 asserts that the β−α degree separation represents the geometric effect of anchor pair at $p_i,p_j$ on the localization accuracy of MN at p. Two anchors with $β-α=π/2$ degree separation $(g(p_i,p_j)(p)=\sqrt{2})$ are best in localization accuracy, whereas two anchors with $β-α=0$ degree separation (colinear) $(g(p_i,p_j)(p)=\infty)$ are worst. The smaller the $g(p_i,p_j)(p)$, the better the accuracy of localization. The same results are also obtained by a number of the references cited herein.

The GDOP is intimately related to the minimum possible variance (the Cramer-Rao bound) for an unbiased estimator. The GDOP can be derived from the Cramer-Rao bound (CRB) under the two assumptions (See, J. Chaffee and J. Abel, GDOP AND THE CRAMER-RAO BOUND, Position Location and Navigation Symposium, IEEE, 11:663-668, April 1994): (1) mean values of distance measurement are in the same order of magnitude; (2) distance measurement variances are identical.

This simplification leads to the relation between the GDOP and localization variance $σ^2$ (sof an unbiased estimator) as $σ=σ_d·GDOP$, where $σ_d$ refers to distance measurement deviation. This relation becomes $\sqrt{CRB}=σ_d·GDOP$ if an efficient estimator is used. This indicates that the localization performance of (any estimator) is closely associated with $σ_d$ and GDOP. The following corollary establishes a theoretical lower bound for localization error of any estimators in terms of measurement variance.

Corollary 1 Let $σ_d$ denote distance measurement deviation, and σ denote localization deviation. Then $$σ \geq \sqrt{2} \cdot σ_d$$

Proof. By combining the results of $σ \geq \sqrt{CRB}=σ_d·GDOP$ ((11)), we have $σ \geq GDOP·σ_d \geq \sqrt{2}σ_d$. The corollary is thus proved.

The corollary establishes a lower bound on the localization performance in relation to ranging performance. It also suggests that localization accuracy can be improved through anchor selection.

Optimal Anchor Pair Selection

Let $p_i$, $1 \leq i \leq m$ be a set of positions of anchors accessible to MN at p. The optimal anchor pair from m anchors is as $$g_m(p_1, \ldots, p_m)(p) = \min_{\substack{1 \leq i,j \leq m \\ i \neq j}} g(p_i, p_j)(p) \quad (13)$$

The function $g_m(p_1, \ldots, p_m)(p)$ refers to an anchor pair with the minimum GDOP value among its alternatives, and thus is called the optimally selected anchor pair (OSAP). Notice that $g(p_i,p_j)(p) \equiv g_2(p_i,p_j)(p)$. While the $g_m(p_1, \ldots, p_m)(p)$ function is independent of measurement noise, in practice, the value of $g_m(p_1, \ldots, p_m)(p)$ is obtained through noisy measurements $d_1, \ldots, d_m$, and thus is influenced by noises.

FIG. 2 and FIG. 3 depict the OSAP area partition under different anchor placements, both in the absence and the presence of noise. FIG. 2 shows the OSAP area partition under AP (0,100),(0,0),(100,0). Three anchors are assumed to be accessible to a MN within the 100×100 area.

First we look at the noise-free scenario. Each colored area in the left-hand side graph in FIG. 2 represents an anchor pair chosen over its two alternatives based on (13). The white colored areas represent the regions in which the anchor pair at (0,100),(0,0) is chosen for its least vulnerability to noise. The blue colored areas represent the regions where the anchor pair at (0,0),(100,0) has its geometric advantage over its alternative anchor pairs. The red colored areas, which exhibit a very complicated geometric feature, refer to the regions where the anchor pair at (100,0),(0,100) is expected to produce the most accurate localization.

As may be appreciated, these observations seem counterintuitive. For a given area, it appears to be intuitively sound that a pair of nearest anchors should be chosen for better localization accuracy. However, based on Theorem 1, it is the angle, not the distance, that determines localization accuracy.

We now look at a noisy scenario. The right-hand side graph in FIG. 2 plots the OSAP area partition under the noise level of σ=1.0. The presence of noise makes the borderlines on different colored areas rough and unsmooth. This is because the borderlines in fact correspond to the isolines by two selected anchor pairs and hence are highly sensitive to noise.

FIG. 3 shows the OSAP area partition under the AP (0,100),(7,50),(3,40). In this scenario, the anchor pair at (0,100),(3,40) covers the dominant area. As compared with the left-hand side graph, the noise impact on the optimal anchor pair selection becomes so prominent such that the white areas almost disappear on the right-hand side graph in FIG. 3. Though only three anchors are involved, the OSAP area partition produces a rather complicated geometric patterns as shown in FIG. 2 and FIG. 3.

To see the impact of noise on the selection of an optimal anchor pair, we define a metric called the OSAP hit ratio. An OSAP hit means that using the OSAP, an anchor pair chosen in a noisy scenario is the same as one selected in the noise-free scenario. The OSAP hit ratio reflects the degree of resilience of an AP to noise. FIG. (4) plots the average OSAP hit ratio of two AP setups as a function of noise level over a HCT. It shows that the anchor placement (0,100),(7,50),(3,40) has a smaller OSAP hit ratio than the anchor placement (0,100),(0,0),(100,0) and thus is less resilient to noise. This solidifies the fact that an AP is an important factor that affects both the localization accuracy and the resilience to noise.

Disambiguation

For a set of accessible anchors at $p_i (1 \le i \le m)$ and MN at p, once the optimal anchor pair, say (i,j), is identified according to ((13)), then the position establishment via the optimal anchor pair at $(p_i, p_j)$ is equivalent to solving the following equations $$\|\hat{p} - p_i\| = \tilde{d}_i, \|\hat{p} - p_j\| = \tilde{d}_j \tag{14}$$

Figure 5:
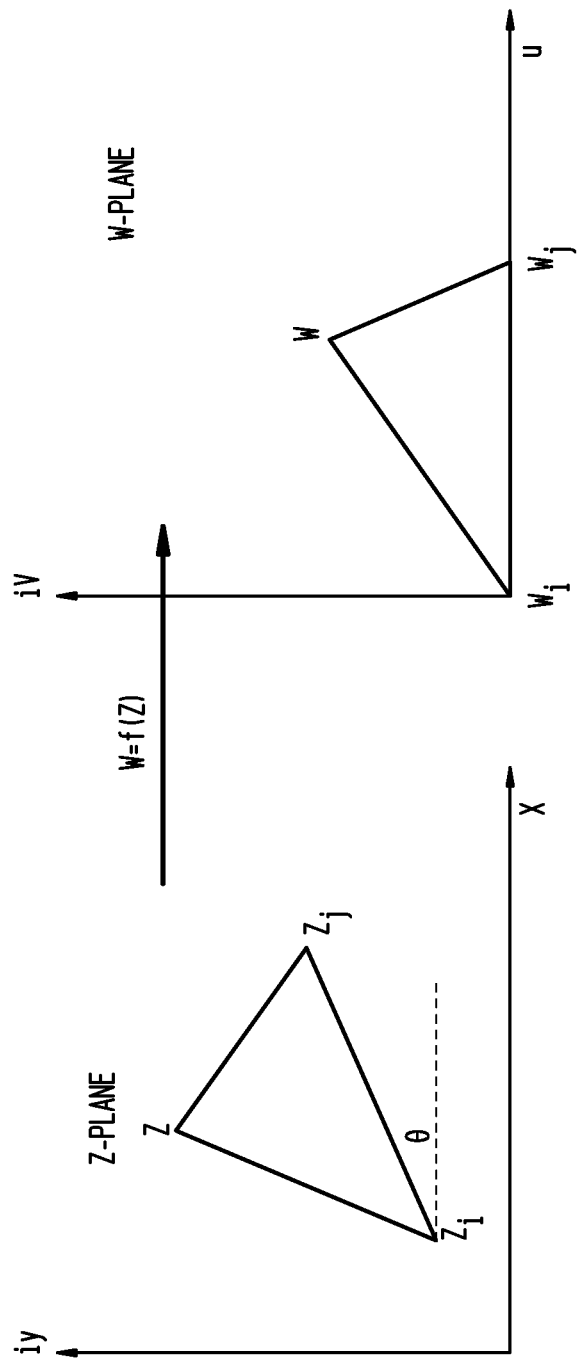
FIG. 5 shows a linear transformation from z-plane to w-plane.
Figure 6A:
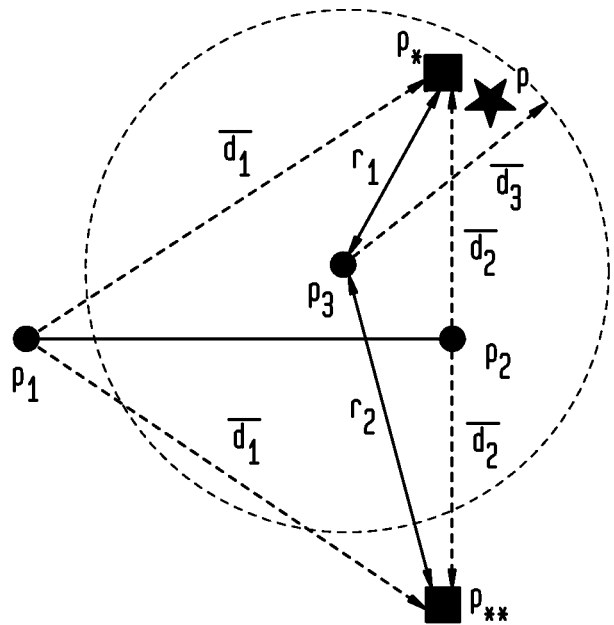
FIG. 6 shows low noise level (a) and high noise level (b); a) low noise level in $\bar{d}_3$, $|r_1-\bar{d}_3|<|r_2-\bar{d}_3|$; b) high noise level in $\bar{d}_3$, $|r_1-\bar{d}_3|>|r_2-\bar{d}_3|$ ($\bar{d}_1,\bar{d}_2,\bar{d}_3$ refer to distance measurements (dash lines) between anchors at $p_1,p_2,p_3$ and MN at p (orange star); reference anchor at $p_3$; $p_*$ (black square): estimated position w.r.t. AP $(p_1,p_2)$ and $p_3$; $p_{}$ (green square): mirrored position w.r.t. AP $(p_1,p_2)$ and $p_3$
Figure 6B:
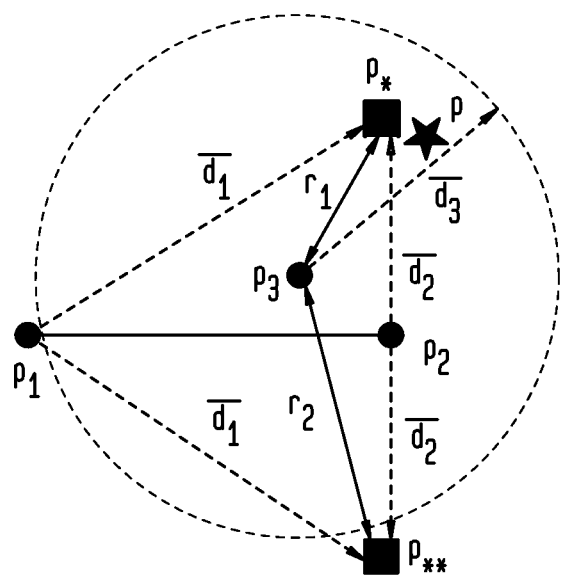
Figure 8:
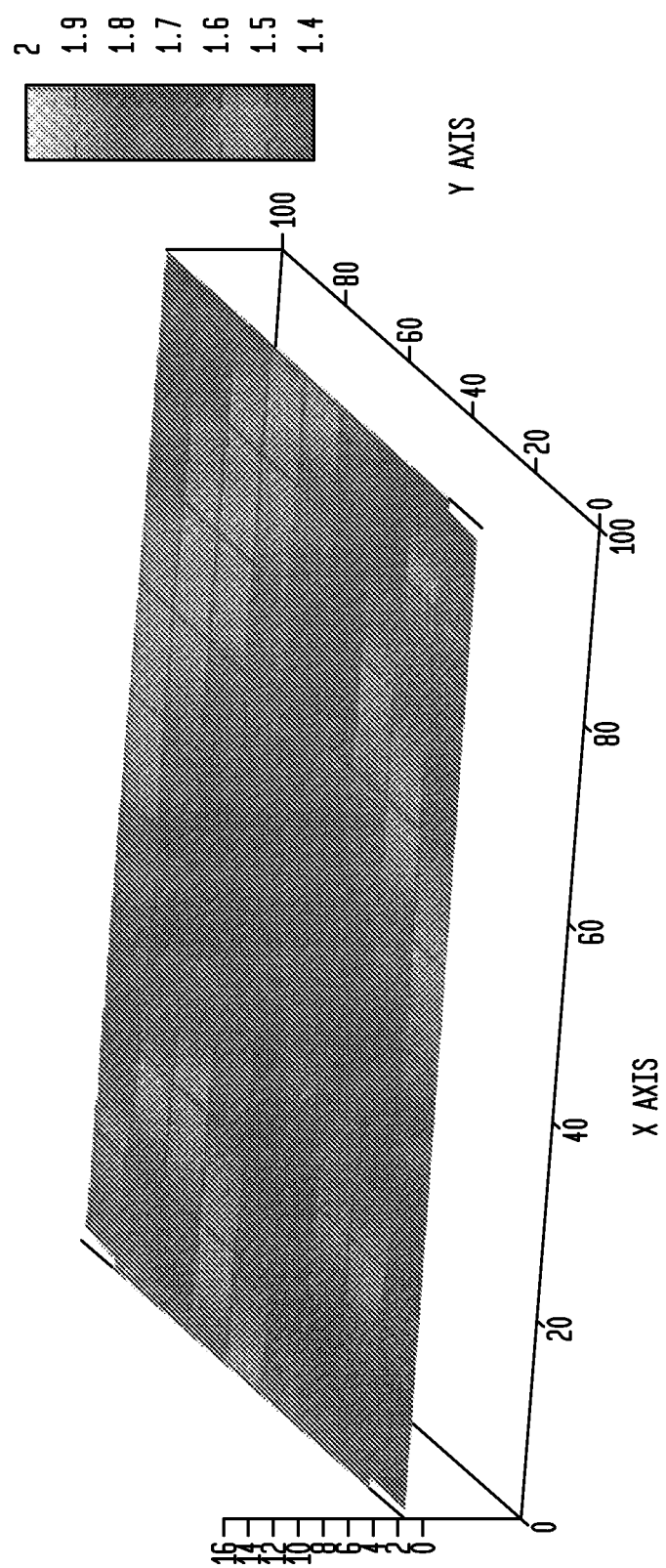
FIG. 8 shows LVT of anchor placement.
Figure 9:
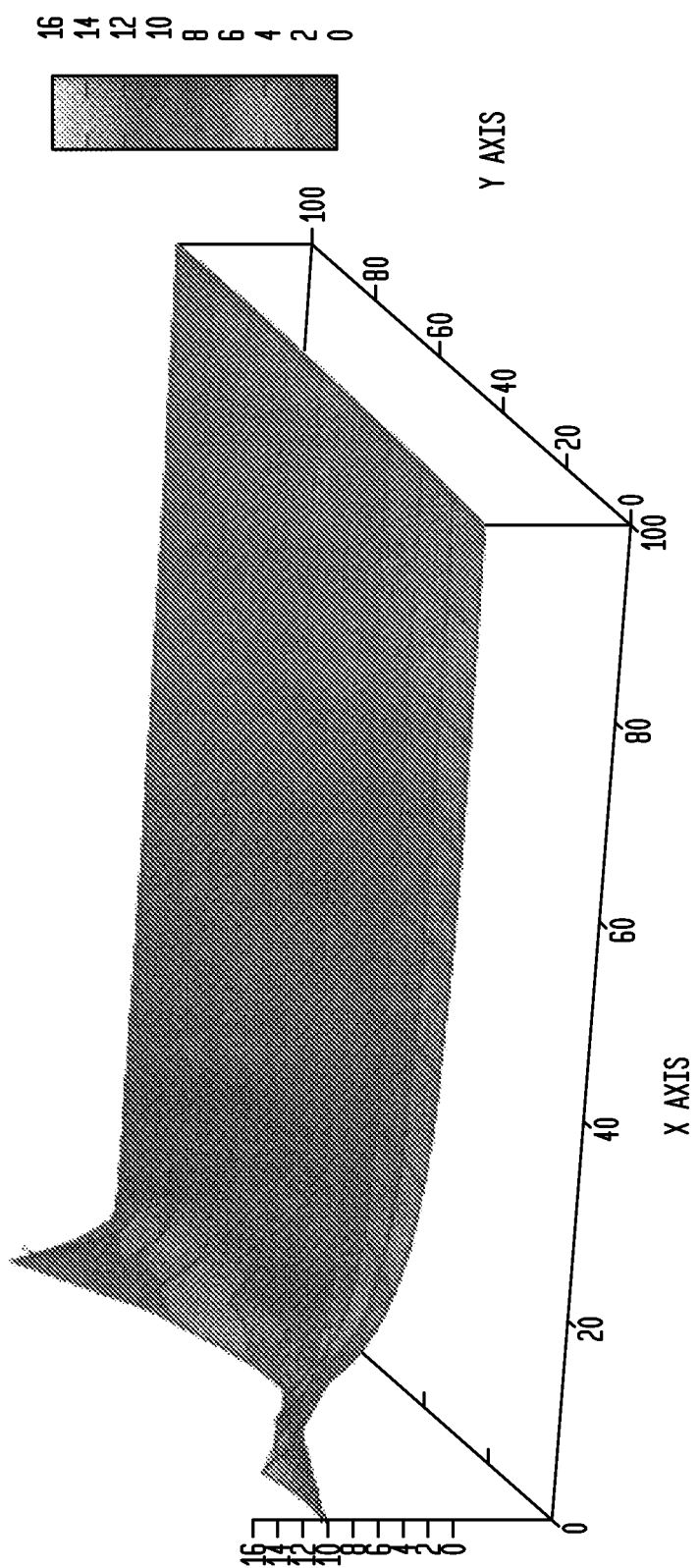
FIG. 9 shows LVT of anchor placement.
Figure 10:
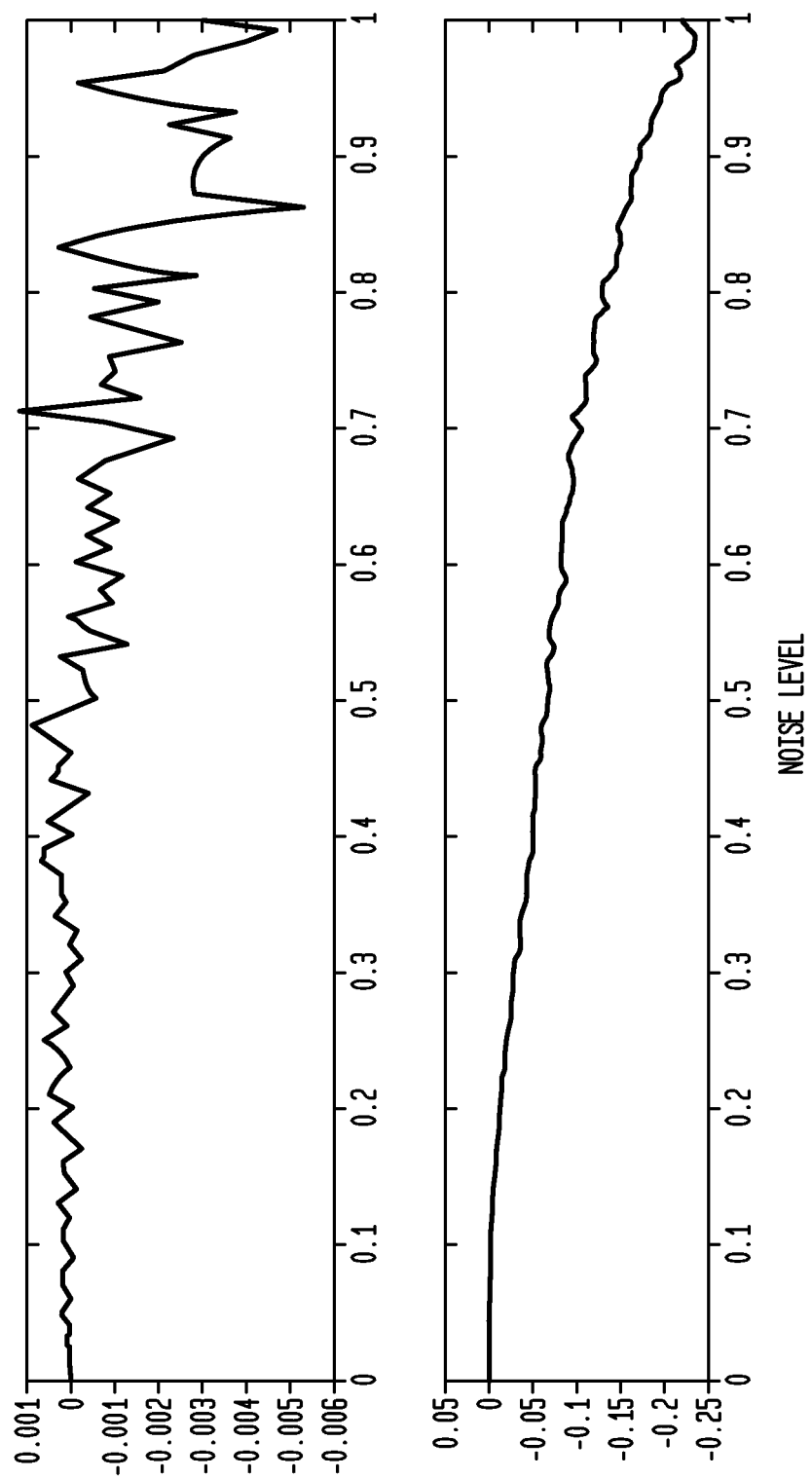
FIG. 10 is a graph.
Figure 11:
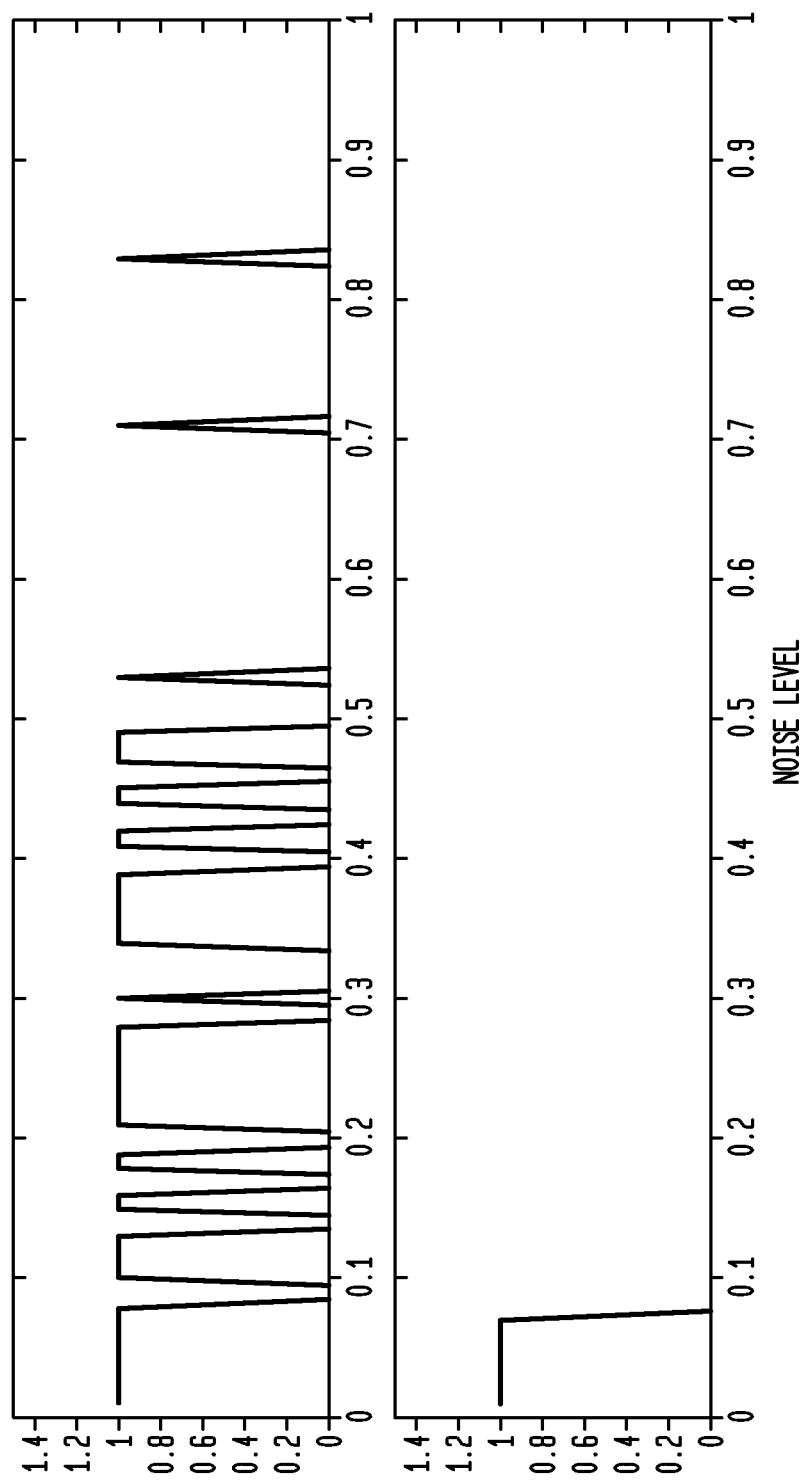
FIG. 11 is a graph.
Figure 12:
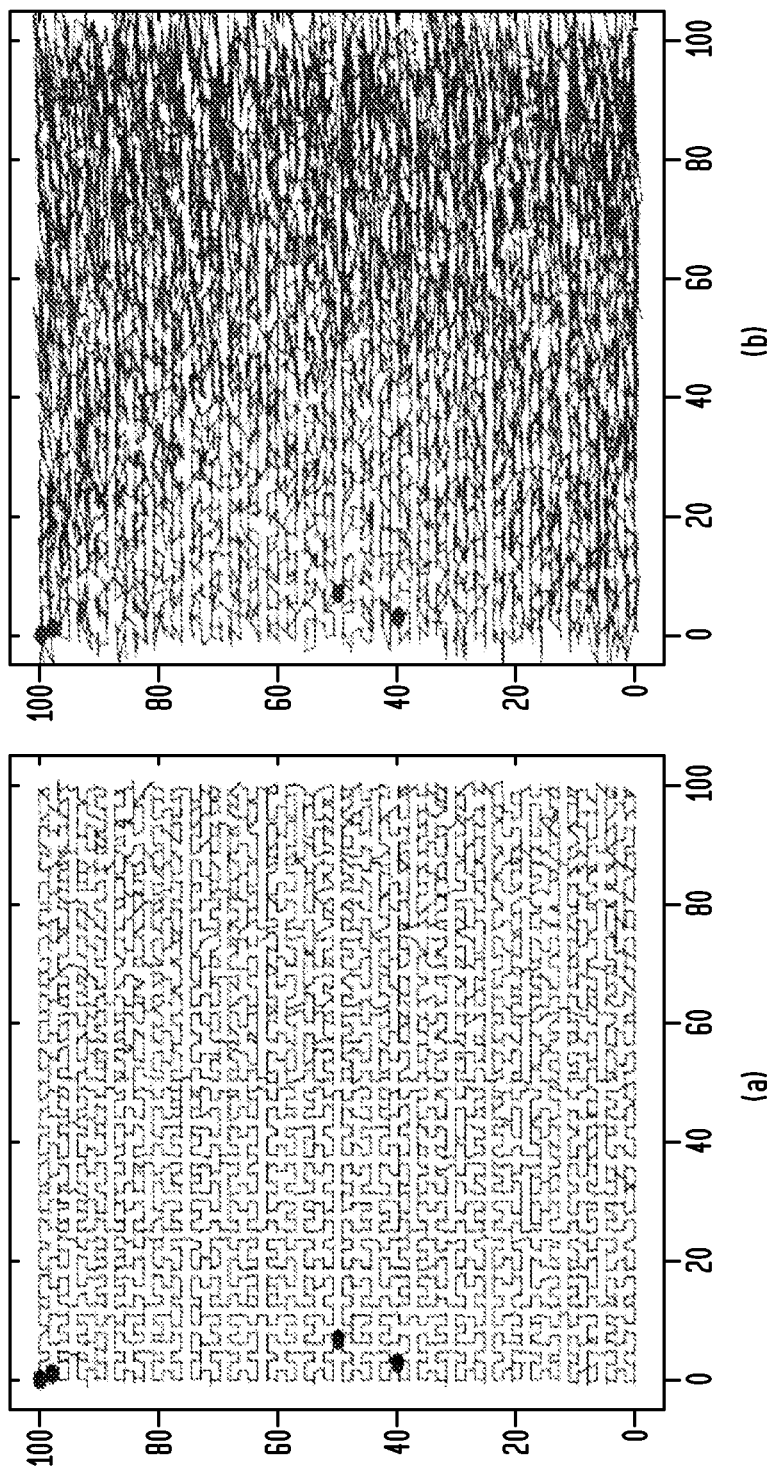
FIG. 12 shows restored curve by LSM (a) and (b)
Figure 13:
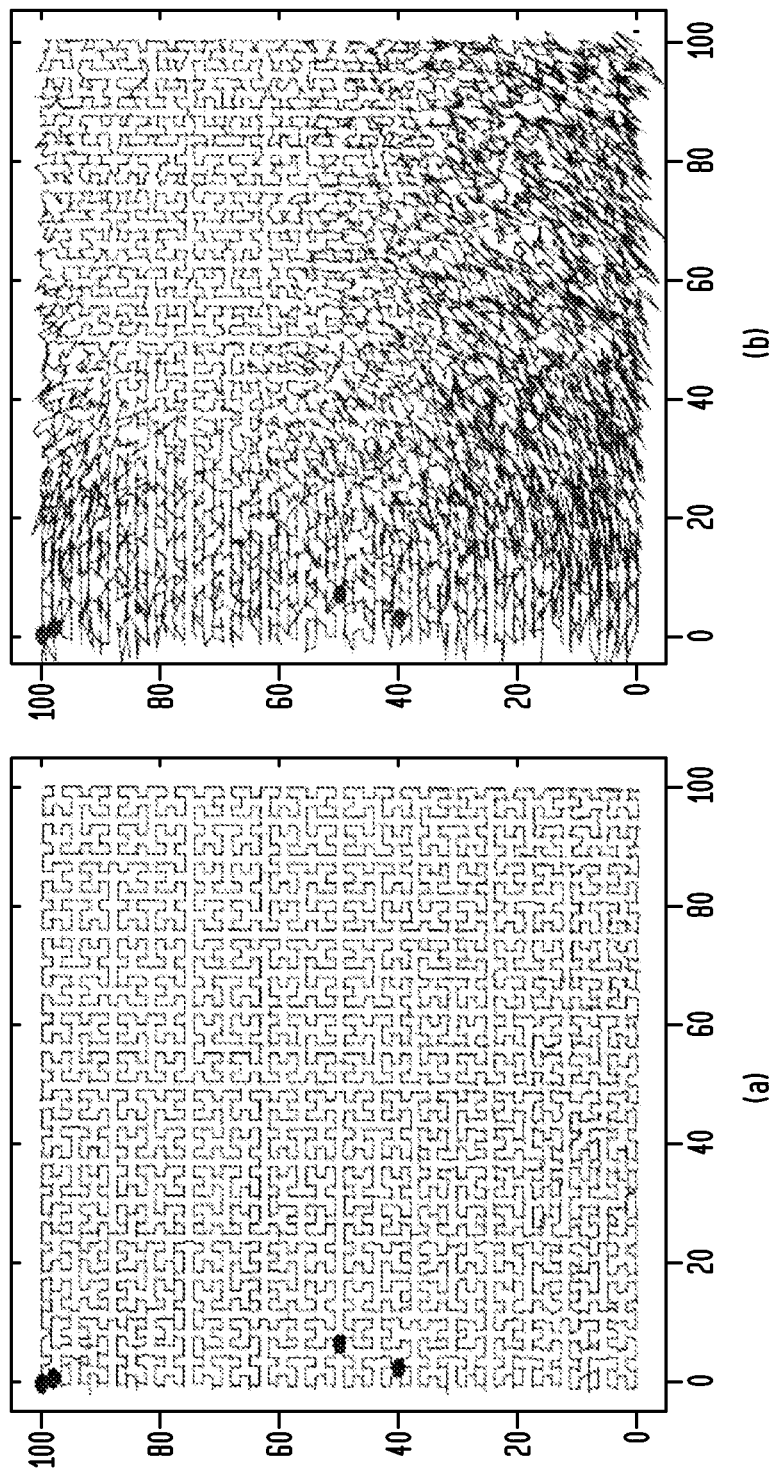
FIG. 13 shows restored curve by LSM (a) and (b)
Figure 14:
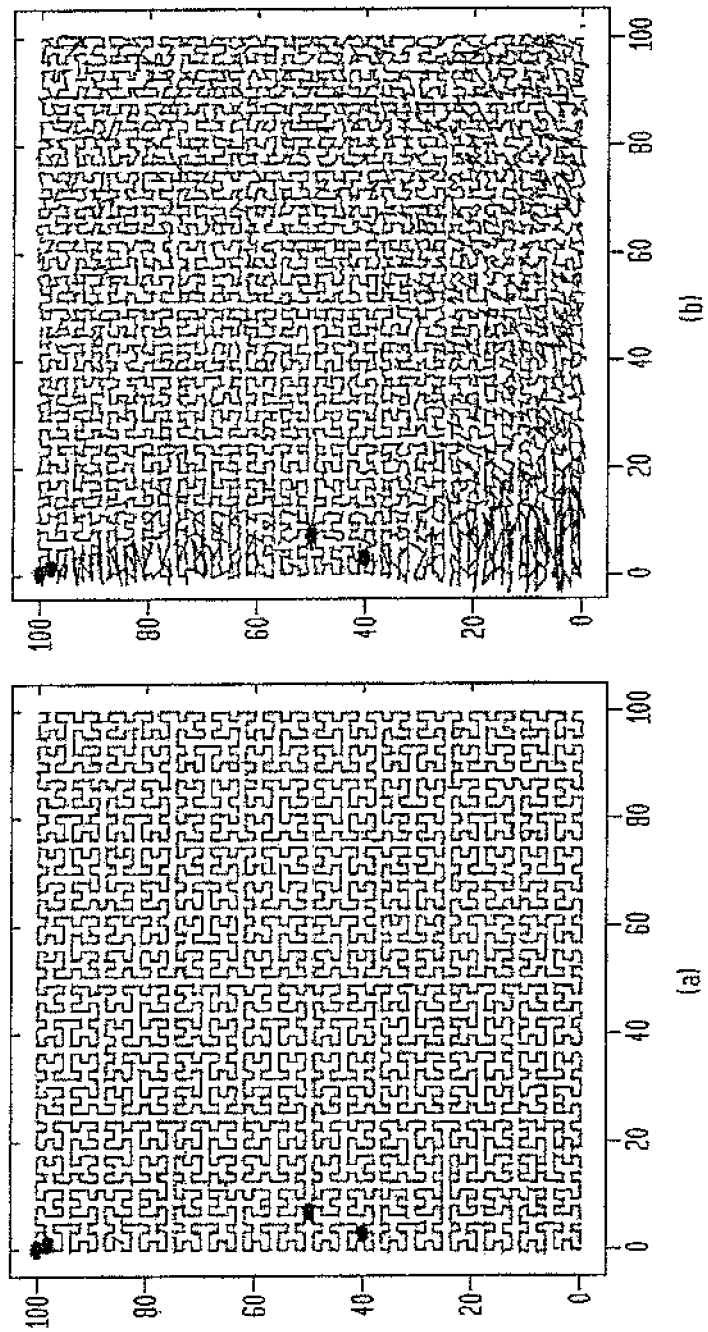
FIG. 14 shows restored curve by TPLM (a) and (b)
Figure 15:
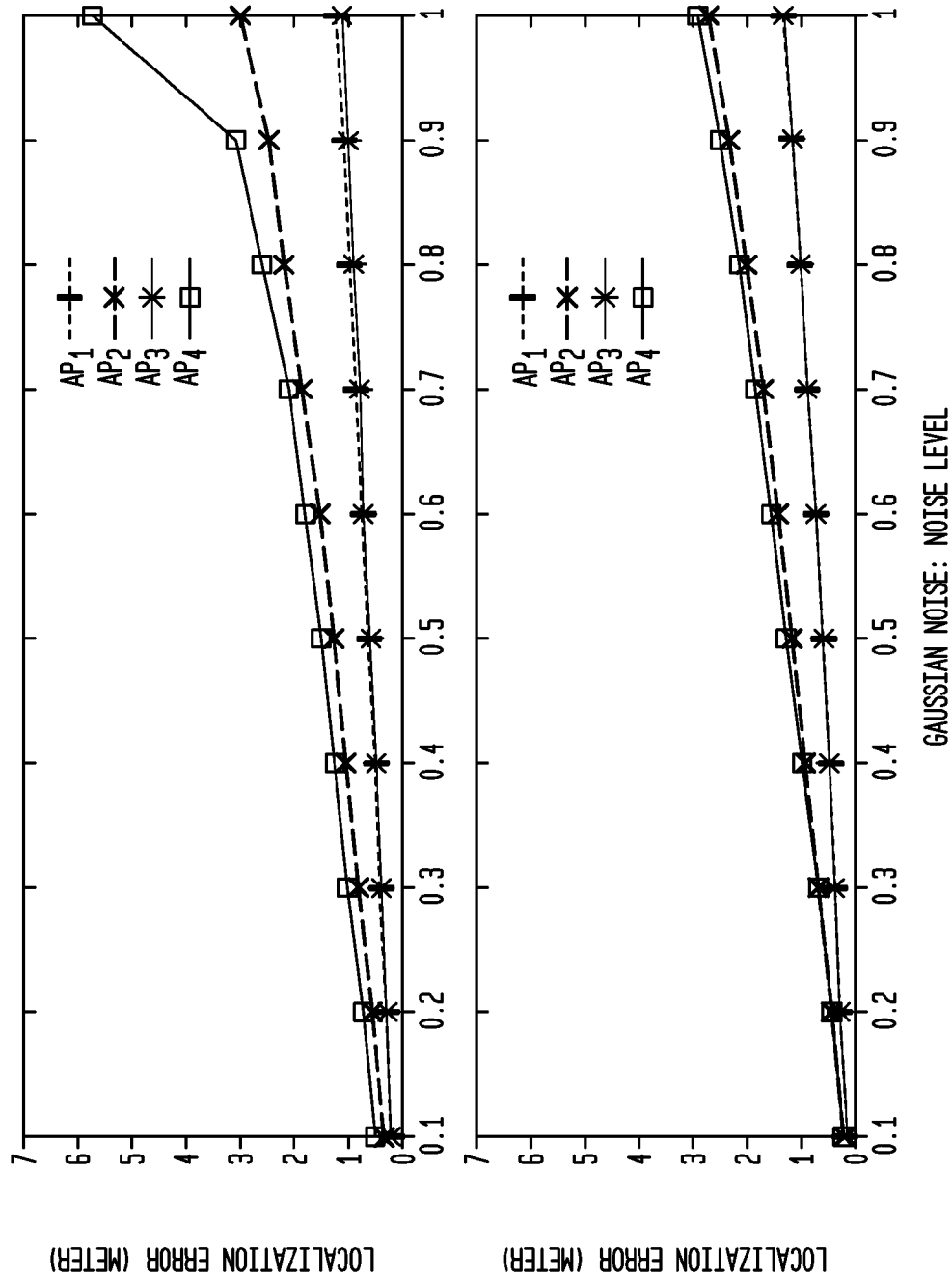
FIG. 15 is a graph showing accuracy (top) GDM; and TPLM (bottom) Gaussian noise.
Figure 16:
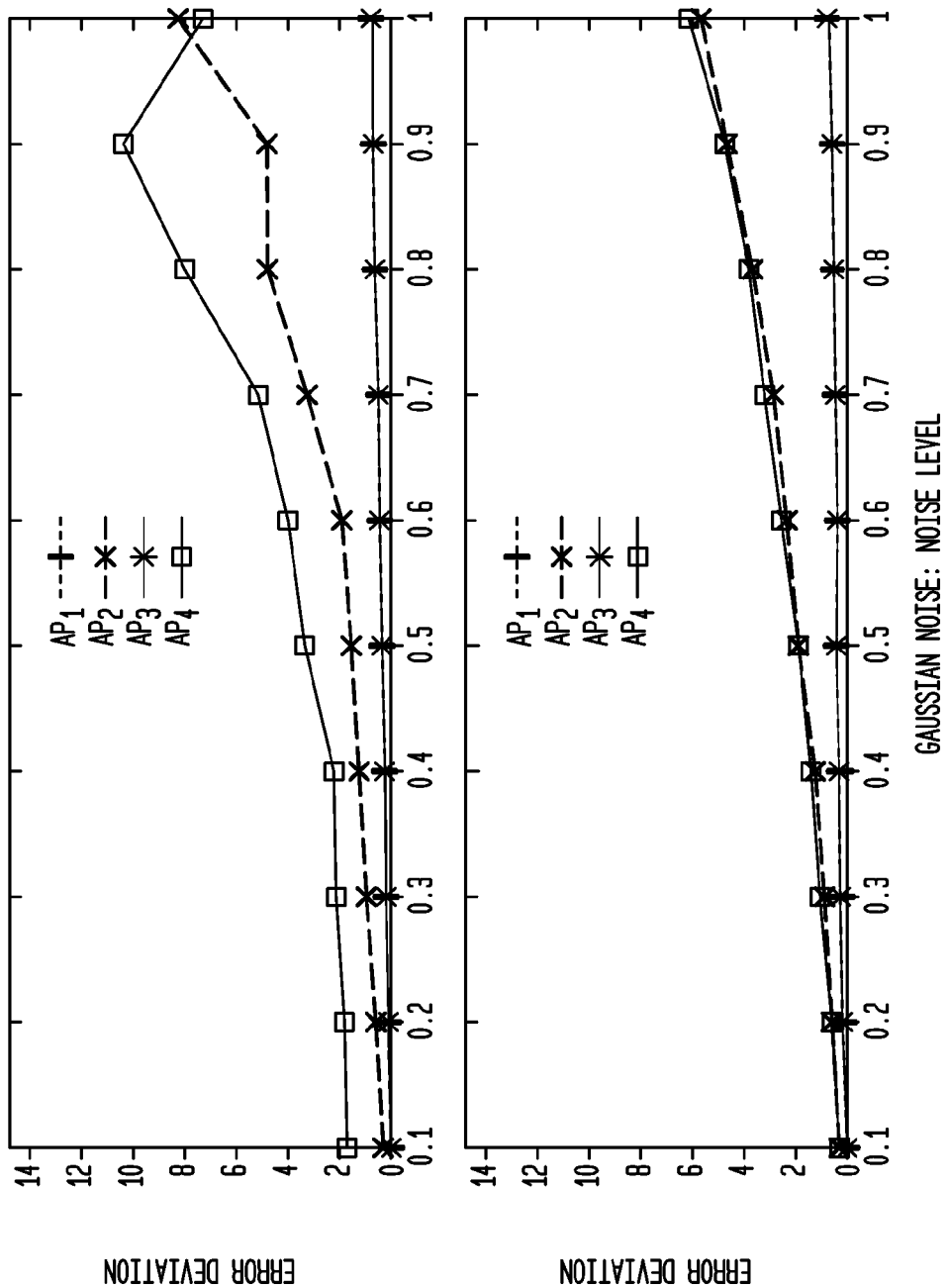
FIG. 16 is a graph showing Deviation (top) GDM; and TPLM (bottom) Gaussian.
Figure 17:
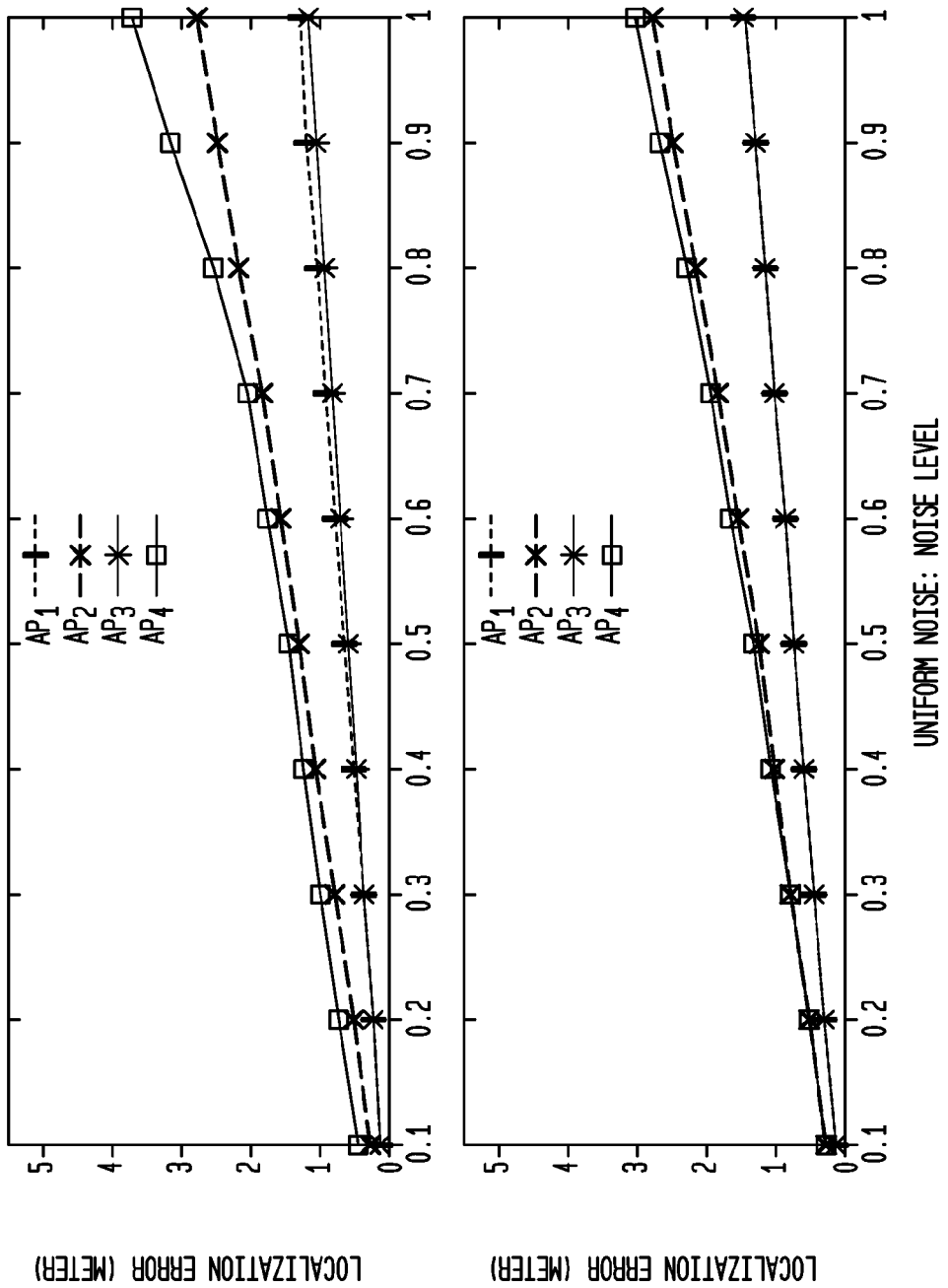
FIG. 17 is a graph showing Accuracy (top) GDM; (bottom) TPLM uniform noise.
Figure 18:
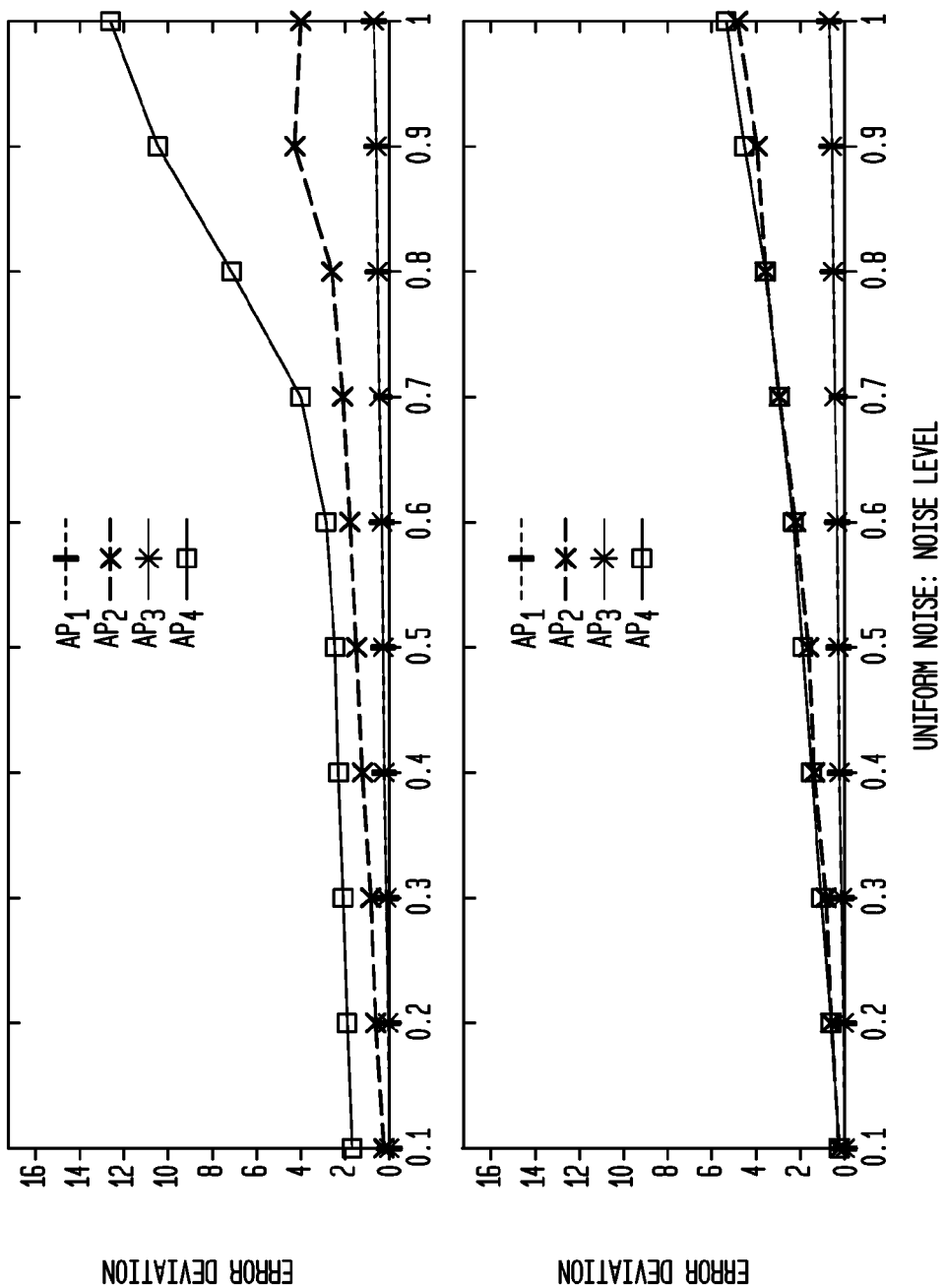
FIG. 18 is a graph showing Deviation (top) GDM; (bottom) TPLM uniform noise.
Figure 19:
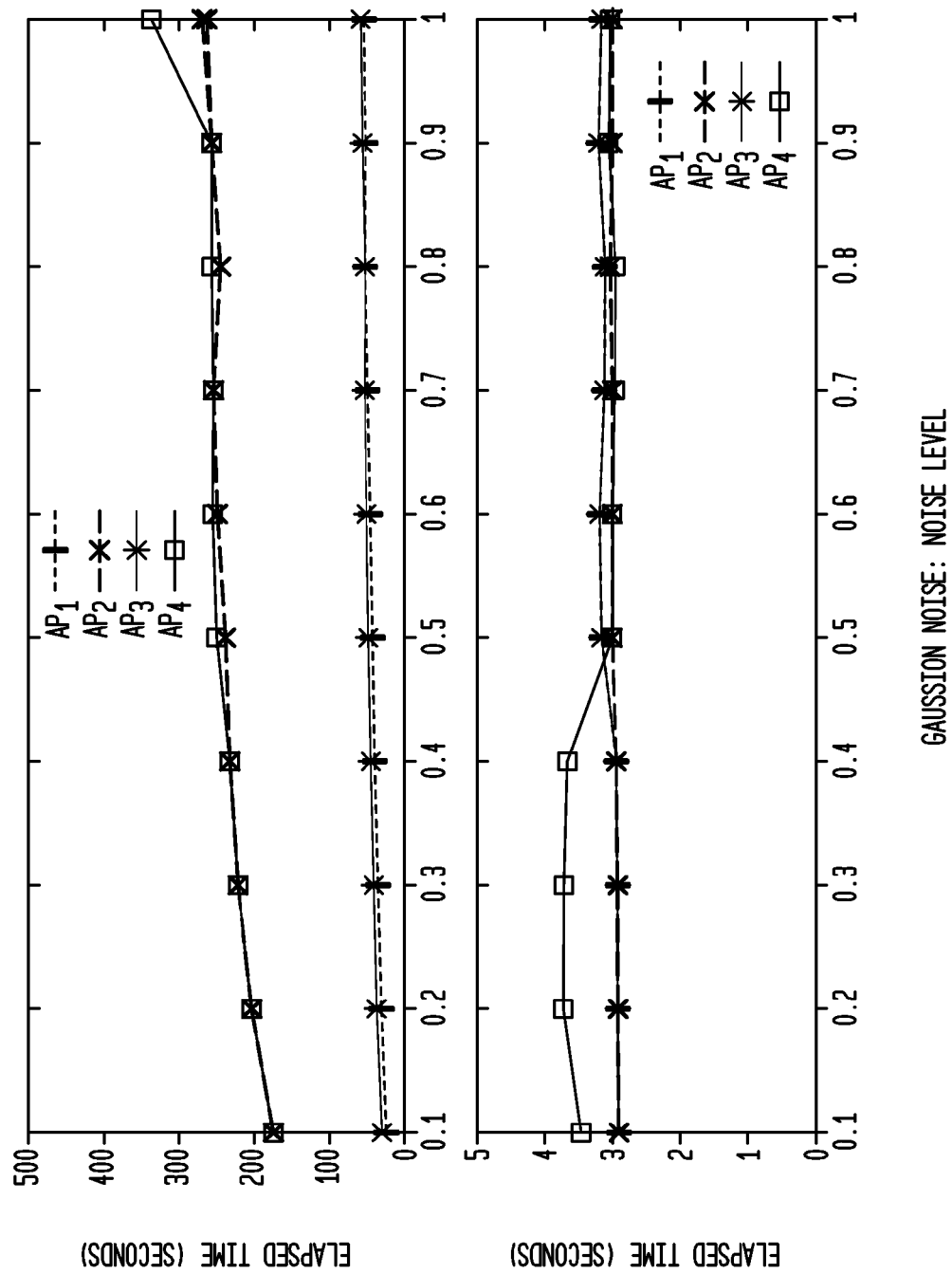
FIG. 19 is a graph showing Elapsed time (top) GDM; (bottom) TPLM (normal noise)
Figure 20:
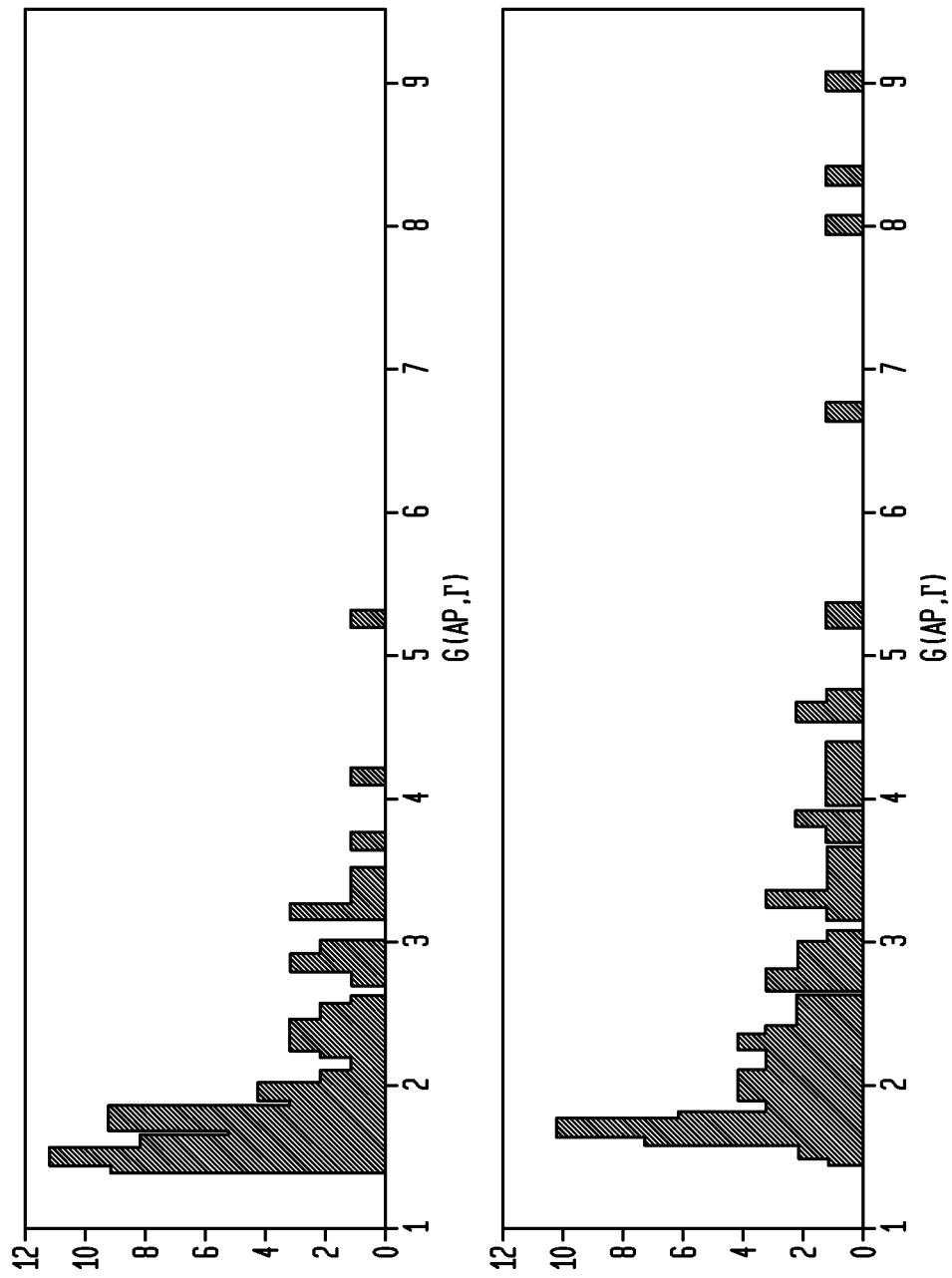
FIG. 20 is a graph showing.
Figure 21:
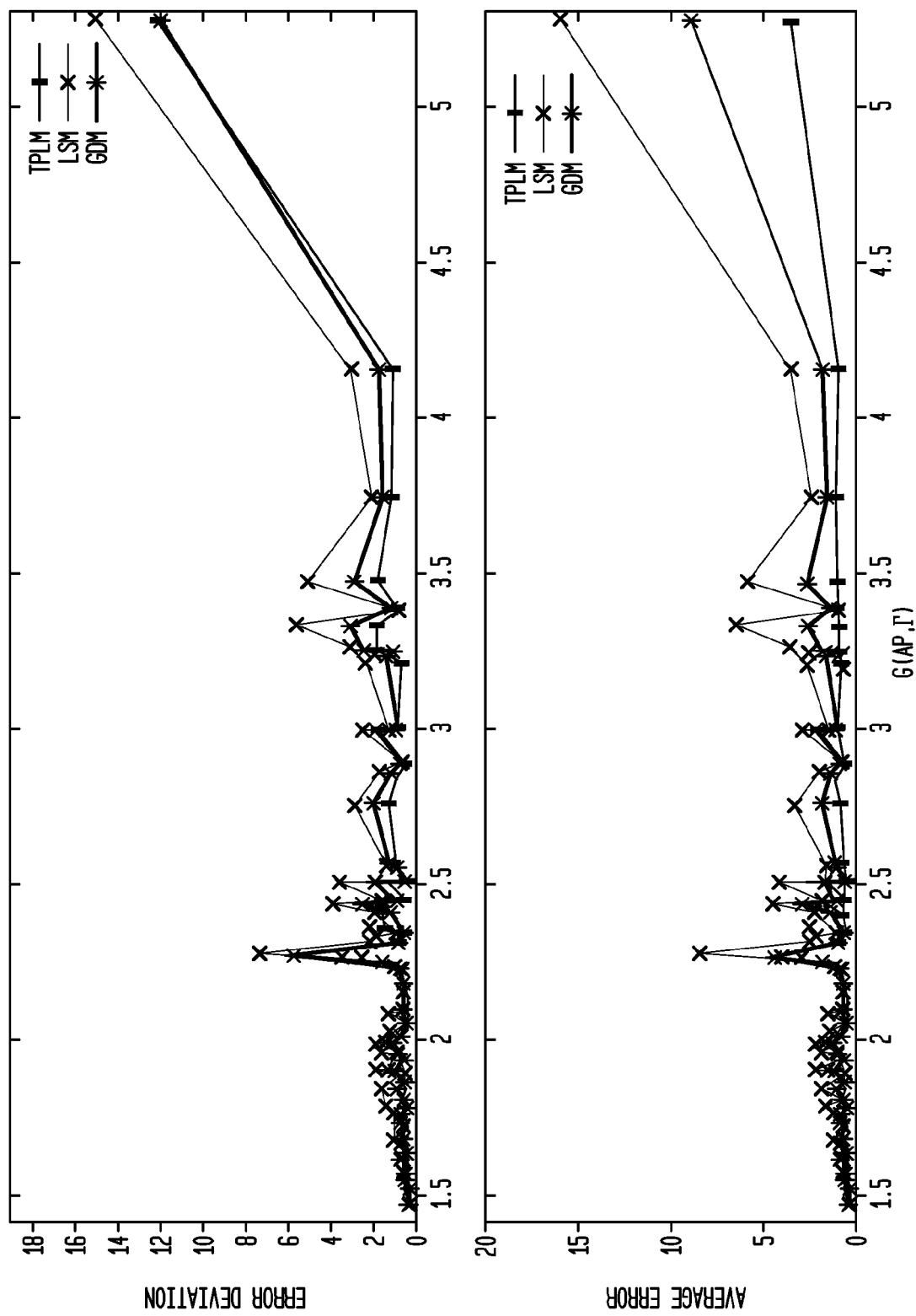
FIG. 21 is a graph showing (top) error deviation; (bottom) average error.
Figure 22:
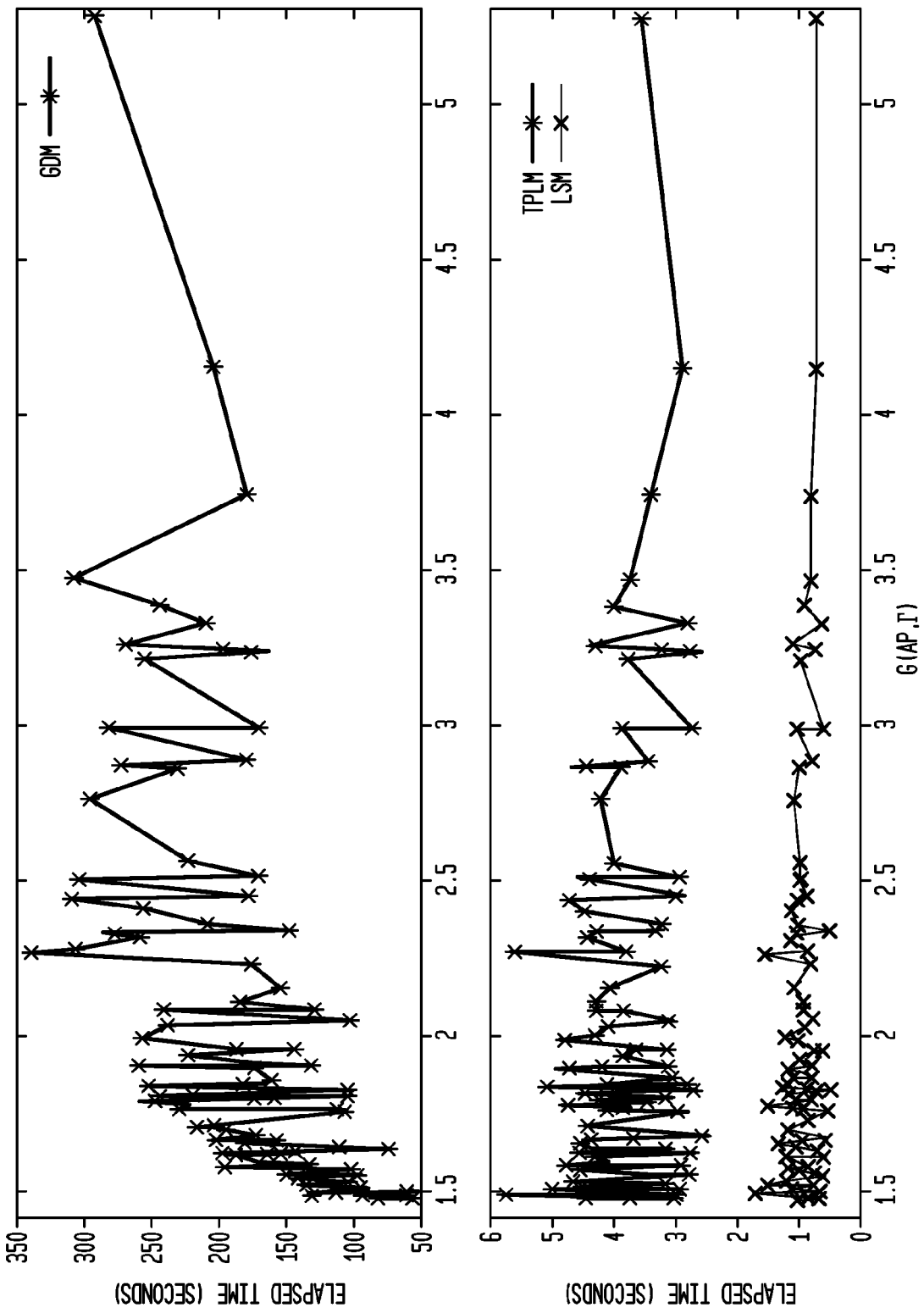
FIG. 22 is a graph shown elapsed time by GDM (top); and elapsed time by LSM and TPLM (bottom)
Figure 24:
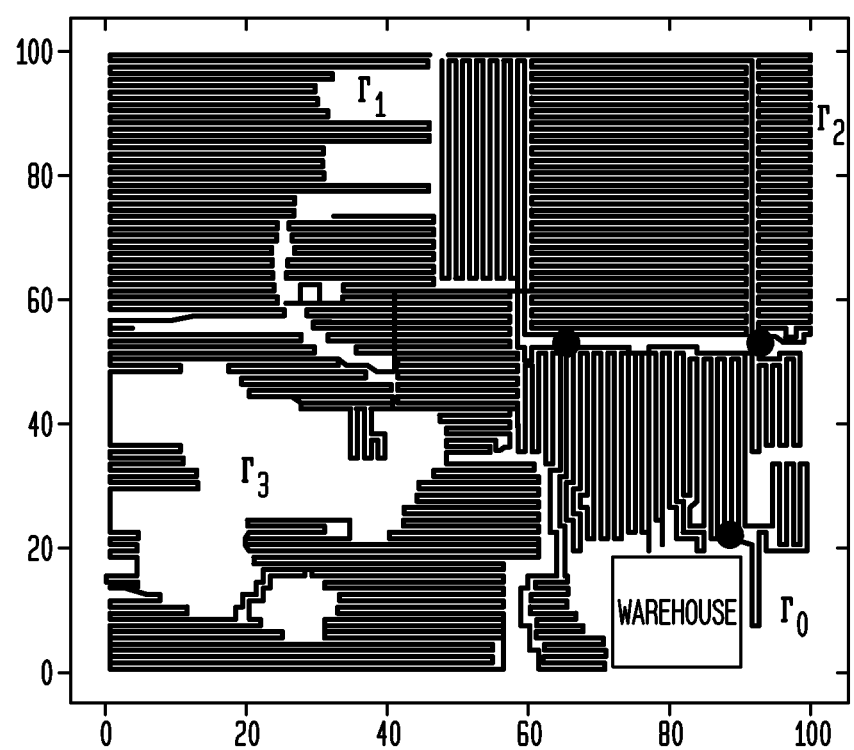
FIG. 24 is a graph showing four trajectories.
Figure 25C:
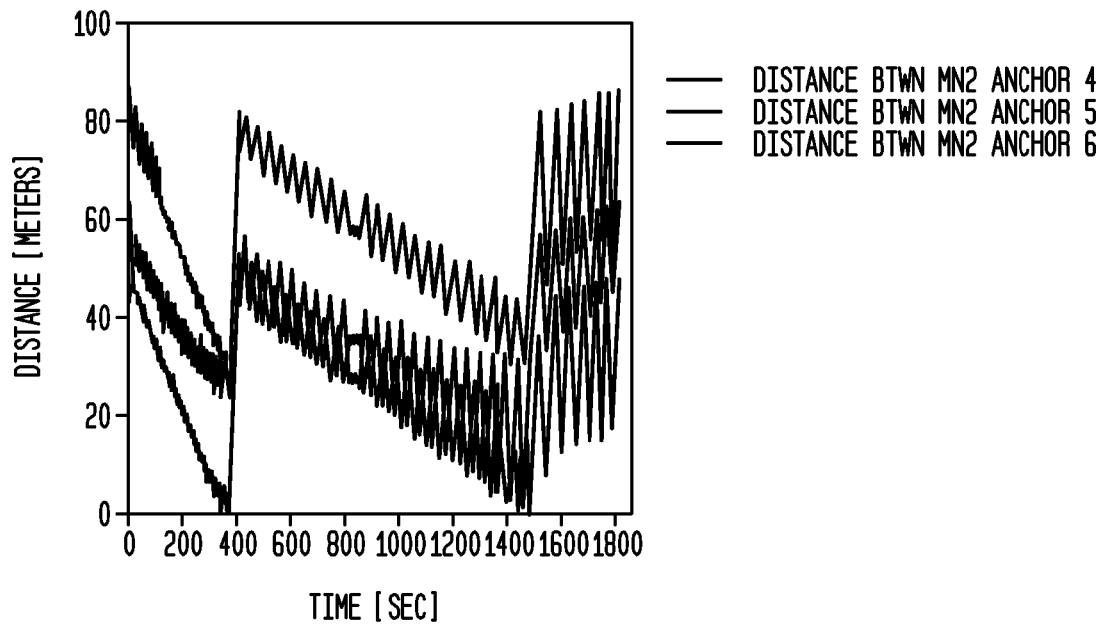
FIGS. 25 (a), (b), (c), and (d) are distance measurements to three UWB anchors.
Figure 25D:
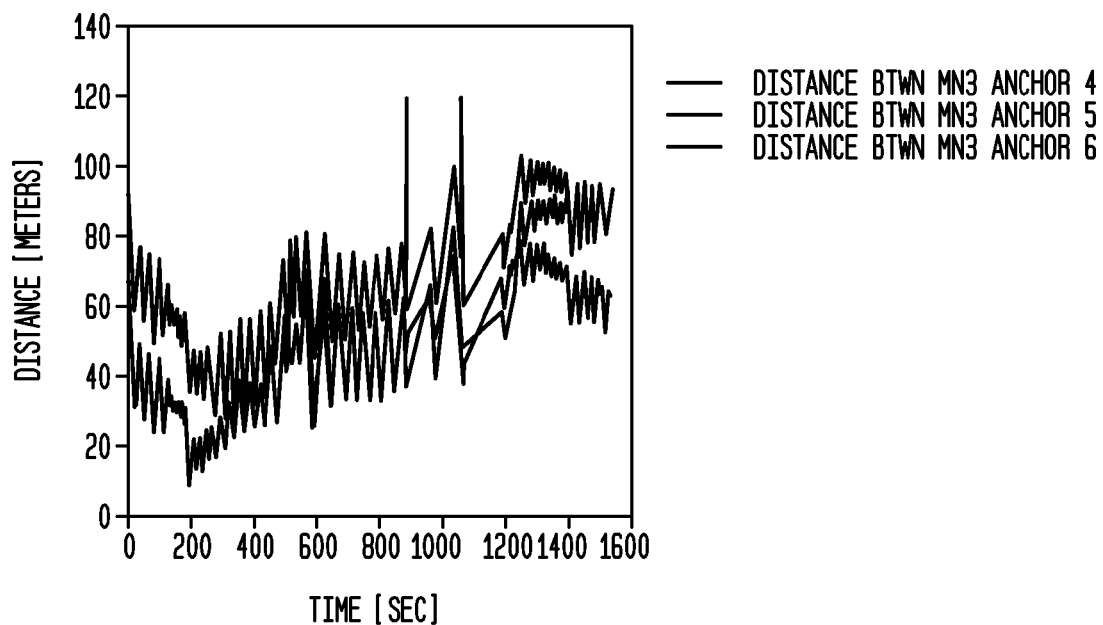
Figure 26:
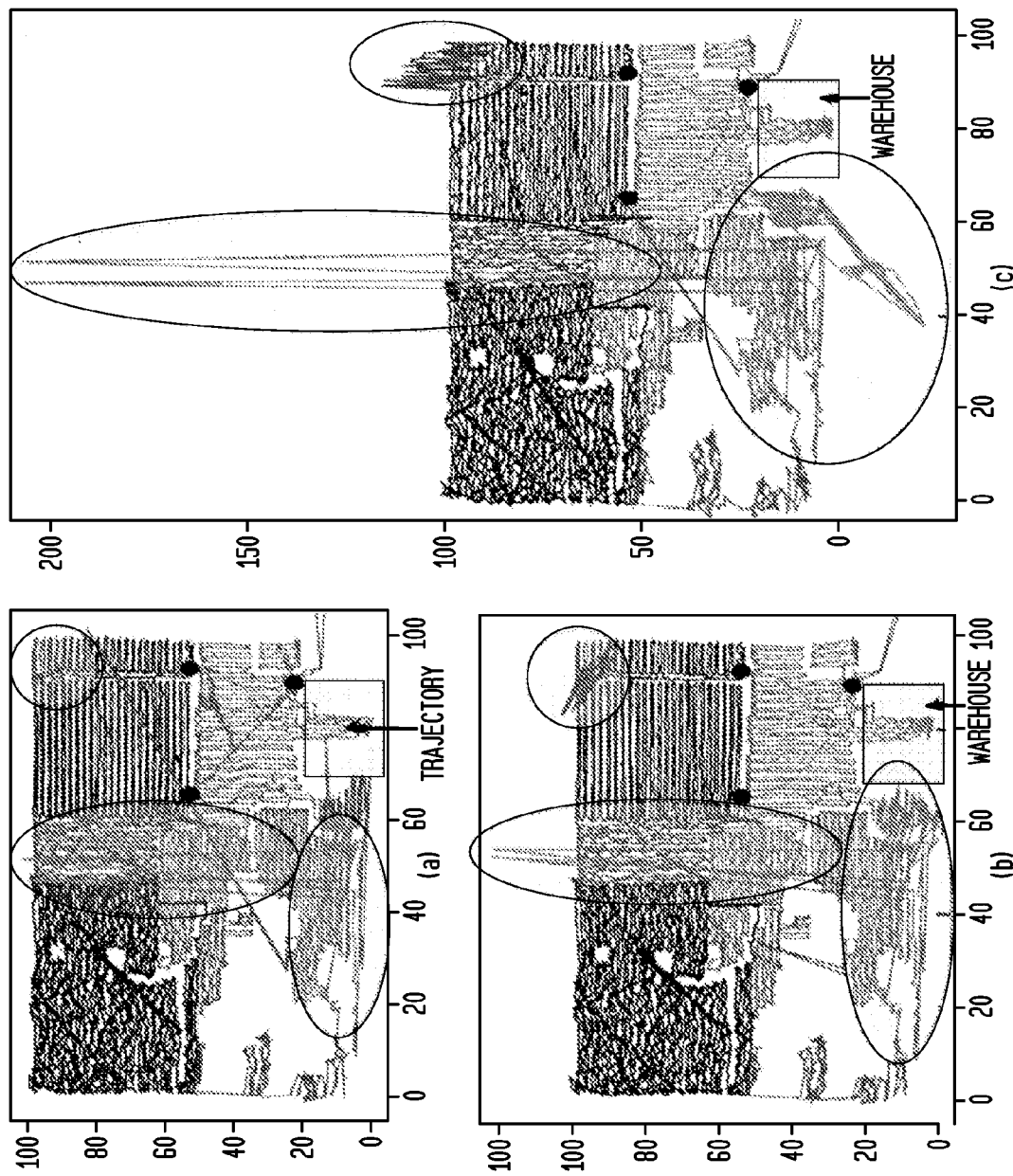
FIG. 26 is a graph showing restored trajectories by (a) TPLM, (b) GDM; (c) LSM.

While simple in appearance, solving (14) algebraically could be lengthy. Instead of using solving (14) directly, we try to solve this problem via a displacement and rotation transformation. Accordingly, we let z=x+jy be a complex number where x is the real part of z, denoted as Re(z), y the imaginary part, denoted as Im(z), and j is the imaginary emit number ($j^2 = -1$). The complex number z=x+jy can be interpreted as a point $(x,y) \in R^2$. The complex conjugate of z is defined as $\bar{z}=x-jy$. Let $f(z)=w=u+jv$ be a function that maps (x,y) in the z-plane into (u,v) in w-plane, via a displacement followed by a rotation as follows: Let $w_i = f(z_i)$ be (0,0) in the w-plane, and $w_j = f(z_j)$ be a point on the u-axis, i.e., Im($w_j$)=0 (see FIG. 5). Such a mapping can be written as $$w = u + jv = (z - z_i)e^{-j\theta}, \theta = \arctan\left(\frac{y_j - y_i}{x_j - x_i}\right), \tag{15}$$

where $z_j = x_j + jy_j$ is a displacement complex number and θ a rotation angle.

$$f(z_i) = w_i, f(z_j) = w_j, f(z) = w$$

Under the coordinate transformation w=f(z), ((14)) in the z-plane is thus converted to ((16)) in the w-plane $$a) u^2 + v^2 = \tilde{d}_i^2, b)(u - d_{ij})^2 + v^2 = \tilde{d}_j^2 \tag{16}$$

where $d_{ij} = \|p_i - p_j\|$. Manipulation of ((16)) yields $$u = \frac{(d_{ij}^2 + \tilde{d}_i^2 - \tilde{d}_j^2)}{2d_{ij}}, v = \sqrt{\tilde{d}_i^2 - \left(\frac{d_{ij}^2 + \tilde{d}_i^2 - \tilde{d}_j^2}{2d_{ij}}\right)^2} \tag{17}$$

((16)) could have two solutions; w=u+jv and its conjugate $\bar{w}$=u−jv. Using a mapping function in ((15)), the two solutions to ((14)) can be obtained as $$\begin{pmatrix} \hat{x} \\ \hat{y} \end{pmatrix} = \begin{pmatrix} \cos(\theta) & \sin(\theta) \\ \sin(\theta) & \cos(\theta) \end{pmatrix} \begin{pmatrix} u \\ v \end{pmatrix} + \begin{pmatrix} x_i \\ y_i \end{pmatrix}$$

$$\begin{pmatrix} \hat{x} \\ \hat{y} \end{pmatrix} = \begin{pmatrix} \cos(\theta) & \sin(\theta) \\ \sin(\theta) & \cos(\theta) \end{pmatrix} \begin{pmatrix} u \\ -v \end{pmatrix} + \begin{pmatrix} x_i \\ y_i \end{pmatrix} \tag{18}$$

We now discuss a robust disambiguation strategy for picking one position from two possible position realizations. FIG. (6) illustrates the fundamental issue in the disambiguation phase. Let $p_*, p_{**}$ be two positions obtained via the optimal anchor pair at $(p_1, p_2)$, and let an anchor at $p_3$ denote the reference anchor to disambiguate between $p_*$ and $p_{**}$. Since are symmetric with respect to a line that connects anchor pair at $(p_1, p_2)$, we call the position, which is on the same side of the reference anchor $p_3$, as the estimated position ($p_*$) (black square), and the position, which is on the opposite side of the reference anchor, as the mirrored one ($p_{**}$) (green square).

Let $r_1$ define the estimated distance between $p_*$ (black square) and $p_3$, and $r_2$ define the mirrored distance between $p_{**}$ (green square) and $p_3$. The disambiguation is then reduced to comparing $|r_1 - \bar{d}_3|$ and $|r_2 - \bar{d}_3|$ where $\bar{d}_3$ refers to a distance measurement from anchor at $p_3$ to MN's position.

$$\hat{p} = \begin{cases} p*, & |r_1 - \bar{d}_3| \le |r_2 - \bar{d}_3| \\ p**, & |r_1 - \bar{d}_3| > |r_2 - \bar{d}_3| \end{cases} \tag{19}$$

Rational behind this strategy is that the estimated distance $r_1$ is generally closer to the measurement distance $\bar{d}_3$ than its mirrored distance $r_2$ since the reference anchor $p_3$ is on the same side of MN with respect to the line connecting $(p_1, p_2)$. However, this disambiguation cannot completely prevent a flip error from happening, which mistakes the mirrored position $p_{**}$ as the estimated one $p_*$. A flip error occurs when the position of a reference anchor is (almost) a collinear point of the line connecting $(p_1, p_2)$. In this case, the disambiguation becomes very sensitive to noise. A flip error also can be caused by a high noise. Observe from FIG. (6)(b) that the presence of a noisy spike in $\bar{d}_3$ measurement could cause $|r_1 - \bar{d}_3| > |r_2 - \bar{d}_3|$. Then the mirrored position $p_{**}$ is mistakenly chosen as the estimated one $p_*$.

The following algorithm called Two-Phase Localization Method (TPLM) consists of the two distinct phases: the optimal anchor pair selection (OAPS); and the disambiguation. The goal of the first phase is to select an optimal anchor pair based on ((13)) for deriving two possible position realizations, and that of the second phase is to single out one from two possible position realizations, using the reference position derived from LSM based on ((3)). The reason is that the reference position derived from LSM can be robust to noise, thereby effectively reducing the likelihood of flip errors.

The code between lines 7-7 examines each anchor pair in turn and chooses an optimal anchor pair, which corresponds to ((13)). The code between lines 7-7 calculates two estimated positions via the linear coordinate transformation with respect to the optimal anchor pair $p^+, p^{++}$. Lines 7-7 constitute the basic block of the optimal anchor selection phase. The code between lines 7-7 is used to disambiguate the two possible solutions using the reference position $\breve{p}$ obtained by LSM. For the sake of presentation brevity, the sanity check and optimization code are omitted.

The processing flow in Algorithm 7 entails that the localization accuracy is conditional on whether a flip error occurs in the disambiguation phase: when no flip error occurs, the localization accuracy is purely determined by the OAPS, and when a flip error occurs, the mirrored position is mistaken as the estimated one, resulting in large localization errors.

We present the results of TPLM in Table 2 using the same scenario setups used in Section 2. In all cases, TPLM gives a significant error reduction over LSM with a minor performance degradation as TPLM employs LSM to derive the reference position in the disambiguation phase. It is fairly clear that TPLM is an order of magnitude faster than GDM, and performs slightly better than GDM in localization accuracy.

The distinguishing ingredient in TPLM is its two-phase localization, which makes its localization accuracy conditional on the occurrence of flip errors in the disambiguation phase. Consider AP setups in Table 3 where two anchors are fixed at (100,0),(50,20), and one anchor is placed at specified positions along the 45 degree line. All these anchors are accessible to MN's position at (100,100). Observe that while both the AP setups in FIG. (8)(a)-(b) are different, they share the same maximum degree of separation w.r.t. MN's position ($\pi/4$). As a result, the anchor on the 45 degree line and the anchor at (100,0) form an optimal anchor pair, the reference point derived by LSM is used to disambiguate between two positions obtained in the OAPS phase.

Table 3 presents a performance breakdown of LSM, OSAP and TPLM over 10000 runs with the noise level of 1. A couple of observations can be made: (1) the simulated results show that all the anchor placements in Table 3 yield the same accuracy of the OSAP as they share the same degree of separation with respect to point (100,100); (2) the accuracy of TPLM is determined by that of OSAP when no flip error occurs; (3) the presence of flip errors may produce significant localization errors. For instance, with the anchor at (30,30), the performance of LSM deteriorates enormously, largely induced by a high condition number ($\kappa(A^T A)=5776$). This in turn impairs the ability to correctly disambiguate two positions derived in the OAPS phase and hurts severely the performance of TPLM (there are 1622 flip error occurrences over 10000 runs). It is worth noting that the position disambiguation can be achieved by another means. For example, it is possible to filter flips in practice in some cases where prior positions and maximum or typical velocities or directions are known.

Anchor Placement Impact

The goal of this section is to answer a fundamental question: can we quantitatively compare different anchor placements over an area without field trial. To answer this question, we exploit ((13)) to construct a three-dimensional tomography, which is called the least vulnerability tomography (LVT). A LVT geometrizes the effect of an anchor placement over an area in noise-free environment: the terrain elevation of the LVT has an obvious performance implication: when in a trough area, the noise has less impact on localization accuracy than when in a peak area. FIGS. (9)-(10) visualize the impact difference between the two anchor placements over the traversal region. FIG. (9) shows that the LVT of AP (100,0),(0,0),(0,100) has terrain waves with a elevation variation from $\sqrt{2}$ to 2. In contrast, the LVT of AP (0,100),(7,50),(3,40) shown in FIG. (10) has relatively flat terrain for the most part of the region and a dramatic elevation variation from 2 to 16 in the vicinity of (0,0) and (0,100). Overall, the terrain waves in FIG. (10) has a much higher elevation than that in FIG. (9). This implies that AP (0,100),(0,0),(100,0) would outperform AP (0,100),(7,50),(3,40), which has been validated by the results in Tables 1 & 2.

The observation of FIGS. (9)-(10) induces us to extend the notion of geometric dilution of precision from a point into an area. Define $g(p_i,p_j)(\Omega)$ as the average GDOP value over an area $\Omega$. The relation between $g(p_i,p_j)(\Omega)$ and $g(p_i,p_j)(p)$ or $g(p_i,p_j)(x,y)$ is $$g(p_i, p_j)(\Omega) = \frac{1}{|\Omega|} \int_\Omega g(p_i, p_j)(x, y) \, dx \, dy \quad (20)$$

where $|\Omega|$ refers to the area size. Let $g_m(p_1, \ldots, p_m)(\Omega)$ denote the average of $g_m(p_1, \ldots, p_m)(p)$ over $\Omega$ with respect to the m available anchors at $p_i$, $i=1, \ldots, m$. The relation between $g_m(p_1, \ldots, p_m)(\Omega)$ and $g_m(p_1, \ldots, p_m)(p)$ ($g_m(p_1, \ldots, p_m)(x,y)$) becomes $$g_m(p_1, \ldots, p_m)(\Omega) = \frac{1}{|\Omega|} \int_\Omega g_m(p_1, \ldots, p_m)(x, y) \, dx \, dy \quad (21)$$

$$= \frac{1}{|\Omega|} \int_\Omega \min_{1 \leq i,j \leq m} g(p_i, p_j)(x, y) \, dx \, dy$$

Similarly, the notion of $g(p_i, p_j)(p)$ can be extended from a point p to a trajectory $\Gamma$ in the form of line integral as $$g(p_i, p_j)(\Gamma) = \frac{\int_\Gamma g(p_i, p_j)(x, y) \, ds}{|\Gamma|} \quad (22)$$

where $|\Gamma|$ refers to the length of $\Gamma$ and the symbol ds is an arc length. Let $\Gamma$ be parameterized by time t, and (x(t),y(t)) be the position of a MN at time t. The trajectory is then expressed by discrete time-step k, $(x(t_k),y(t_k))$. The average elevation over $\Gamma$ is $$g(p_i, p_j)(\Gamma) = \frac{\sum_{1 \le k \le n} g(p_i, p_j)(x(t_k), y(t_k))}{n} \quad (23)$$

One can easily extend ((22)) to any case involving more than two anchors as $$g_m(p_1, \ldots, p_m)(\Gamma) = \frac{1}{|\Gamma|} \int_\Gamma g_m(p_1, \ldots, p_m)(x, y) dl \quad (24)$$

$$= \frac{\int_\Gamma \min_{1 \le i, j \le m} g(p_i, p_j)(x, y) ds}{|\Gamma|}$$

The discrete form of (24) becomes $$g_m(p_1, \ldots, p_m)(\Gamma) = \frac{\sum_{1 \le k \le n} \min_{1 \le i, j \le m} g(p_i, p_j)(x(t_k), y(t_k))}{n}. \quad (25)$$

((21)) provides a means for quantifying the impact of an AP over an area. In practice, due to the arbitrariness of the area boundary and of an anchor placement, it would be impossible to derive a closed-form expression. In this paper, we will employ Trapezium rule numerical method to compute ((21)). It is done by first splitting the area into 10,000 non-overlapping sub-areas, then applying the Trapezium rule on each of these sub-areas.

Let AP denote a set of anchors at $(p_1, \ldots, p_m)$. Define a function $G(AP,\Omega)$ ($G(AP,\Gamma)$) that calculates the average LVT elevation of AP over an area $\Omega$ (a trajectory $\Gamma$). For a given area $\Omega$, $AP_a$ is said to be less vulnerable to noise than $AP_b$ if $G(AP_a,\Omega)$ is less than $G(AP_b,\Omega)$.

Table 4 presents a numerical impact calculation of different APs over $\Omega$ (100×100 region) and over $\Gamma$ (the Hilbert curve trajectory). Comparing $G(AP_3,\Omega)$ and $G(AP_3,\Gamma)$ in Table 4 shows that the difference between them is very small. However, computation of $G(AP_3,\Omega)$ takes about 23 seconds, as opposed to 0.2 seconds in computing $G(AP_3,\Gamma)$. This means that by exploiting the space-filling property of the Hilbert curve, we can use an efficient line (Hilbert trajectory) integral to approximate a costly area integral.

The AP impact ranking calculated in Table 4 implies that the localization accuracy over the region under $AP_2$ is worst while that under $AP_3$ is best. The results obtained in noisy environments shown in Table 2 show that both $AP_1$ and $AP_3$ are better than $AP_2$ and $AP_4$ in localization accuracy, which are in line with the impact ranking in Table 4. However, the subtle geometric advantage of $AP_3$ over $AP_1$ and of $AP_4$ over $AP_2$ may not fully materialize in a noisy environment. As mentioned before, but reiterated here as it is critically important: the impact ranking in Table 4 is calculated using an OSAP in ((13)) devoid of flip errors. While the results by TPLM in Table 2 are subject to flip errors in the disambiguation phase.

To get a more refined comparison of $AP_1$ and $AP_3$ and of $AP_2$ and $AP_4$, we conduct an experimental study on TPLM under different APs under a noise range from 0.01 to 1 with increment size of 0.01. At each noise level, the average error of an anchor placement AP over 100 HCTs, denoted by $\overline{AP(\Gamma)}$, is obtained. The top and bottom graphs in FIG. (11) represent the average accuracy difference between $AP_1$ and $AP_3$, and $AP_2$ and $AP_4$, respectively. We clear see that within a given noise range, the average accuracy difference between $AP_1$ and $AP_3$ over HCT is in a range of $10^{-3}$, and that between $AP_2$ and $AP_4$ is in a range of $10^{-2}$.

To visualize a subtle difference, we introduce the sgn function as sgn(x)=1 if x>0 and sgn(x)=0 otherwise. The top and bottom graphs in FIG. (12) represent the functions sgn($\overline{AP_1(\Gamma)}-\overline{AP_3(\Gamma)}$) and sgn($\overline{AP_2(\Gamma)}-\overline{AP_4(\Gamma)}$) under increasing noise level. FIG. (12) essentially confirms that $AP_3$ is less vulnerable than $AP_1$ and $AP_4$ is less vulnerable than $AP_2$ when noise level is less than 0.09, which is in line with the impact ranking calculated in Table 4. It also shows that the subtle geometric advantage of $AP_4$ over $AP_2$ ($AP_3$ over $AP_1$) could be diminished or outweighed by increased noise in distance measurement.

Simulation Study

The aim of this section is threefold: first, to validate the efficacy of TPLM in noise environments, in comparison to LSM and GDM; second, to study the impact of noise model on localization performance; and third, to investigate the random anchor placement impact on TPLM, LSM, and GDM.

Visualizing Noise-Induced Distortion

To visualize the difference among LSM, GDM, and TPLM, we plot the restored Hilbert curves by LSM, GDM, and TPLM under Gaussian noise model in FIGS. (13)-(15) using $AP_4$ in Table 4. Notice that anchor positions are plotted as solid black circles.

Visual inspection reveals the apparent perceived difference among the restored Hilbert curves by LSM, GDM and TPLM: when the noise level σ is 0.2, the restored Hilbert curve by LSM becomes completely unrecognizable in FIG. (13)(b). While in FIG. (14)(b) the upper right portion of the restored Hilbert curve by GDM to some degree preserves the hallmark of a Hilbert curve, but the most part of the recovered Hilbert curve is severely distorted and barely recognizable. The restored curve by TPLM contrasts sharply with those by LSM and GDM in its preservation of fine details of Hilbert curve for the most part, while having minor distortion in the lower- and upper-left corner areas in FIG. (15)(b). Such spatially uneven localization performance can be explained by examining FIG. (10), which shows that the lower- and upper-left areas exactly correspond to the LVT peak areas where localization is highly sensitive to measurement noise.

The perceived differences between GDM and TPLM in FIGS. (13)-(15) can be quantified as follows: With respect to a HCT, GDM has the average error of 0.69 with standard deviation of 1.88, while TPLM produces the average error of 0.465 with standard deviation of 0.589. In addition, GDM takes about 218.48 seconds per Hilbert curve traversal, in contrast to 2.94 seconds taken by TPLM.

Gaussian Noise Vs. Non-Gaussian Noise

In this subsection, we will compare the performance of GDM and TPLM under Gaussian and uniform noise models, because there are ample scenarios where ranging noise does not exactly follow Gaussian model. In the experimental study, the performance between GDM and TPLM is compared under a same noise level with the different noise models. For Gaussian noise model $N(0,\sigma^2)$, σ refers to the noise level in FIG. (16), and for a uniform noise model U(−a,a), the noise level in FIG. (18) is expressed as $a^2/3$. Thus the noise level 0.3 in the uniform noise model corresponds to $a=0.3\sqrt{3}$. The data presented reflects the average error of GDM and TPLM over 10 HCTs under the anchor placements given in Table 4. All the comparisons are the average errors and as such lower values are better.

The top and bottom graphs in FIGS. (16)-(18) and in FIGS. (17)-(19) represent the localization error and standard deviation curves of GDM and of TPLM, respectively. Under both the noise models, TPLM outperforms GDM by huge margins under $AP_2$ and $AP_4$ in both the localization accuracy (see FIG. (16)-(18)) and reliability (see FIGS. (17)-(19)). Both GDM and TPLM perform indistinguishably under $AP_1$ and $AP_3$. While the impact difference between $AP_1$ and $AP_3$ is barely noticed as their performance curves are overlapped, the performance curves between $AP_1$ and $AP_2$ and between $AP_3$ and $AP_4$ are clearly separated, thus the impact difference $AP_1$ and $AP_2$ and between $AP_3$ and $AP_4$ are evident.

The results show that the Gaussian noise has more impact on GDM than the uniform one. For instance, under the same noise level of 1 and $AP_4$, the average error of GDM under the Gaussian noise is 5.77, as opposed to 3.68 under the uniform noise. By comparison, the performance of TPLM appears to be insensitive to noise models. For instance, under the same noise level of 1 and $AP_4$, the average error of TPLM is 2.97 under uniform noise and is 2.94 under Gaussian noise. FIG. (20) plots the elapsed time by GDM and TPLM for HCT, showing that TPLM is orders of magnitude faster than GDM and insensitive to anchor placements. By contrast, the anchor placement clearly has apparent impact on the convergence rate of GDM.

Random Anchor Impact

We study the impact of random anchor placement on the performance of LSM, GDM and TLPM. To achieve this, the number of anchors are randomly and uniformly placed in 100×100 and 50×100 regions. For each randomly and uniformly generated anchor placement (RUGAP) in a region, the $G(AP,\Gamma)$ function (AP and $\Gamma$ refer to a RUGAP and the HCT in FIG. (1)) is calculated, and the error statistics of LSM, GDM, and TPLM under Gaussian noise level of 0.3 are gathered and compared.

The top/bottom graphs in FIG. (21) show the actual $G(AP, \Gamma)$ distribution obtained by 100 RUGAPs. In the top graph, 3 anchors are randomly and uniformly placed (r.u.p.) in the entire traversal area while in the bottom graph 3 anchors are r.u.p. in the upper half of the traversal area, which accounts for a half traveral area. The top graph in FIG. (21) clearly exhibit positive skewness. This implies that a RUGAP over the entire traversal area in general yields good localization accuracy over the area. Recall that the smaller $G(AP,\Gamma)$ is, the better localization is. The actual $G(AP,\Gamma)$ distribution in the bottom is more dispersed than that in the top graph, suggesting that a RUGAP over the half traversal area underperforms a RUGAP over the entire traversal area.

The performance curves of LSM, GDM, and TPLM under RUGAPs are displayed in FIG. (22) where the x axis refers to the value of $G(AP,\Gamma)$ and the y axis the error deviation and average error. As is clear from FIG. (22), TPLM outperforms both LSM and GDM in localization accuracy and reliability: both the error deviation and average error curves of TPLM are consistently lower than those of LSM and GDM. FIG. (23) presents the elapsed time curves by LSM, GDM, and TPLM for the HCT under 100 RUGAPs. It shows that TPLM performs significantly faster than GDM and is a little bit slower that LSM since TPLM employs LSM to disambiguate between two solutions from OAPS.

Table 5 tabulates the results of RUGAPs with different number of anchors, where $\overline{G(AP,\Gamma)}$ denotes the average $G(AP,\Gamma)$ over 100 RUGAPs with a fixed number of anchors. It shows that the localization accuracy of TPLM over GDM is diminished as the number of anchors increases. It becomes evident that under the noise level of 0.3, the actual performance of LSM, GDM, and TPLM deteriorates as the value of $\overline{G(AP,\Gamma)}$ increases, which substantiates the prediction as suggested in FIG. (21) that a RUGAP over the half traversal area underperforms a RUGAP over the entire traversal area. This solidifies the fact that $G(AP,\Gamma)$ is an effective discriminator for the anchor placement impact on localization performance.

Field Experimental Study

This section focuses on the field test of a DARPA-sponsored research project, using the UWB-based ranging technology from Multispectrum Solutions (MSSI). and Trimble differential GPS (DGPS). Our field testbed area was a 100× 100 square meters. It consisted of an outdoor space largely occupied by surface parking lots and an indoor space inside a warehouse. This testbed area was further divided into 10,000 non-overlapping 1×1 grids. Each grid represents the finest positioning resolution to evaluate RF signal variation.

In the field test, DGPS devices were mainly used for outdoor positioning while MSSI UWB-based devices were used for indoor positioning. The experimental system was composed of four MNs equipped with both the Trimble DGPS and MSSI UWB-based ranging devices. Three UWB devices were used as anchors being placed at known fixed positions. Using the known positions of the UWB anchors and real-time distance measurements, each MN could establish the current position as well as that of other MNs locally, at a rate of approximately 2 samples per second. Each MN could also establish the position via the DGPS unit at a rate of 1 sample per second when residing in the outdoor area. The field test area was divided into four slightly overlapping traversal quadrants denoted as $(\Gamma_0,\Gamma_1,\Gamma_2,\Gamma_3)$. A laptop (MN) equipped with DGPS and UWB ranging devices was placed in a modified stroller as shown in FIG. (24), and one tester pushed the stroller, traveling along a predefined trajectory inside a quadrant (see FIG. (26)). Each run lasted about 30 minutes of walk.

FIG. (25) presents the raw GPS and transformed trajectories (denoted by $\Gamma_2$) over a 30-minute walk in the field test. To reduce the complexity of information retrieval, a linear transformation is given below $$\begin{pmatrix} p_x \\ p_y \end{pmatrix} = \begin{pmatrix} x_f\cos(\alpha) & y_f\sin(\alpha) \\ -x_f\sin(\alpha) & y_f\cos(\alpha) \end{pmatrix} \begin{pmatrix} x' - x'_0 \\ y' - y'_0 \end{pmatrix}, \quad (26)$$

where $x_f$ and $y_f$ refer to the longitude and latitude scale factors, $\alpha$ the orientation angle of the field test area in the GPS coordinate system (see Table 6), $$\begin{pmatrix} p_x \\ p_y \end{pmatrix}$$

is a point in the 100×100 square meters, and $$\begin{pmatrix} x \\ y \end{pmatrix} \text{ and } \begin{pmatrix} x'_0 \\ y_0 \end{pmatrix}$$

a point and the lower-left point in the GPS rectangle.

With repeated trial runs, we found that the UWB signal could barely penetrate one cement wall of the warehouse. To establish positions inside the warehouse, we placed one anchor close to the main entrance of the warehouse while placing two other anchors around the center of the field testbed area. FIG. (26) showed the four trajectories $(\Gamma_0,\Gamma_1,\Gamma_2,\Gamma_3)$ in the field experiment, which are translated from the GPS trajectories using ((26)). A part of $\Gamma_0$ trajectory was inside the warehouse, thus the part of GPS of $\Gamma_0$ was not available. Table 8 provides the calculated results of $g(p_4,p_5,p_6)(\Gamma)$ using the GPS trajectory data, indicating that trajectory $\Gamma_0$ would yield the most accurate localization while trajectory $\Gamma_1$ produced the least accurate localization.

In the field testbed, the trajectory of each MN was controlled by an individual tester during a 30-minute walk. For purpose of the primary experiment being conducted, the strollers were fitted with bicycle speedometers to allow the tester to control his speed, in order to produce sufficient reproducibility for the primary experiment, but not for our testing of localization. Due to inherent variability in each individual movement, an objective assessment of localization accuracy without a ground truth reference is almost impossible. For a performance comparison, we used GPS trajectories as a reference for visual inspection of the restored trajectories by LSM, GDM, and TPLM.

Three curves in FIGS. (7)(a)-(b) represent the field distance measurements between a tester and the three UWB anchor devices during a 30-minute walk in trajectories ($\Gamma_0$, $\Gamma_1$,$\Gamma_2$,$\Gamma_3$). It is fairly obvious that measurement noise in different trajectories vary widely: The distance measurement curves in trajectories ($\Gamma_0$,$\Gamma_3$) are discontinuous and jumpy in FIG. (7)(a), in contrast to the relatively smooth distance measurement curves in trajectories ($\Gamma_1$,$\Gamma_2$) in FIG. (7)(b). A detailed examination showed that such a discontinuity in distance measurements occurred when testers were traveling in an area where UWB devices on stroller have no direct line of sight to some UWB anchors (UWB signal need to penetrate one and two concrete walls), thereby introducing additional noise in trajectory traversal in $F_o$ $F_3$.

FIGS. (26)(a)-(c) show the restored trajectories by TPLM, GDM, and LSM using the UWB ranging technology in the field testing, including a part of $\Gamma_0$ trajectory inside the warehouse. A visual inspection suggests that LSM was extremely prone to measurement noise. As a result, the restored trajectories by LSM were appreciably distorted beyond recognition in some parts. As indicated in FIG. (26)(b), GDM gave an obvious error reduction over LSM but at the expense of computational cost. The most visually perceived difference between LSM and GDM can be seen in the circled areas in FIGS. (27)(b)-(c) where GDM substantially reduced the extent of distortion in these areas as compared with LSM. By contrast, the difference between GDM and TPLM can be visualized in the circled areas in FIGS. (26)(a)-(b). Particularly in the circled area in $F_2$ where TPLM produced a detail-preserved but slightly distorted contour of the trajectory. In addition, the further offline analysis shows that on average GDM takes 18.87 ms for a position establishment, while TPLM/LSM take 0.4/0.35 ms, respectively.

For a given localization method, there exists a perceived difference between the restored $\Gamma_1$ and $\Gamma_2$ in the degree of distortion in restoration, mainly due to the fact: (1) the distance measurements in $\Gamma_1$ had visibly more noise than those in $\Gamma_2$ (see FIG. (7)(b)-(c)); (2) the trajectory $\Gamma_1$ is more vulnerable to noise than $\Gamma_2$ based on the impact ranking in Table 8 calculated using the corresponding GPS trajectories.

At this point, while we have discussed and described the invention using some specific examples, those skilled in the art will recognize that our teachings are not so limited. And while this disclosure is not intended to reduce measurement-caused noise. Rather, it studies the geometric effect of anchor placement on localization performance, attempting to answer two distinct but related questions: a) how to quantify the geometric impact of an anchor placement; (b) how to mitigate the impact of measurement-induced noise. The impact geometrization forms a theoretical basis for the optimal anchor pair selection algorithm, and for effectively mitigating the impact of measurement noise as well. In addition, the proposed approach allows the construction of a least vulnerability tomography (LVT) that can be used to quantitatively compare the geometric impact of different anchor placements on localization accuracy.

To validate theoretical results, using both the least-square and gradient descent methods as the baseline comparison, we have conducted a comprehensive experiment under different anchor placement setups and measurement noise levels, as well as the field experiments using the UWB ranging technology. These experimental results indicate that TPLM outperforms LSM by a huge margin in both the localization accuracy and reliability, and that TPLM is an order of magnitude faster than GDM, and performs slightly better than GDM in both the localization accuracy and reliability. In the future work, we will study how to exploit the information about real-time noise level to further improve localization quality.

Figure 27:
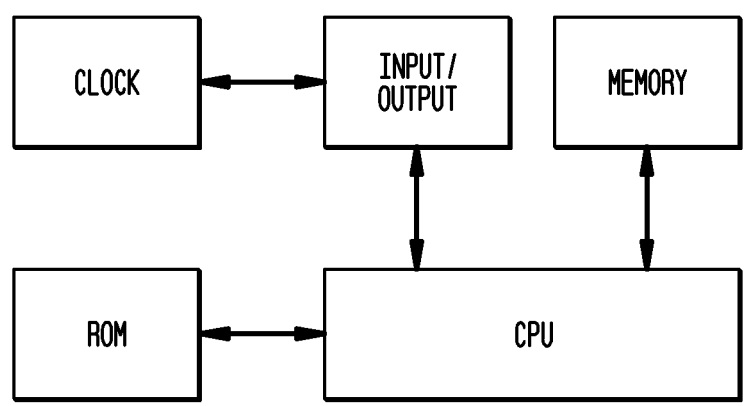
FIG. 27 is a simplified block diagram of an exemplary computer system upon/within which an exemplary method according to the present disclosure may be practiced.

At this point, while we have discussed and described the invention using some specific examples, those skilled in the art will recognize that our teachings are not so limited. More particularly, our inventive teachings when implemented on a computer such as that shown in FIG. 27, a number of useful applications for our invention arise. Accordingly, the invention should be only limited by the scope of the claims attached hereto.

What is claimed is:

1. A computer implemented method for determining geometric impact of anchor placement on localization accuracy of a mobile node (MN) over an arbitrary traversal area of a wireless network, said method comprising the steps of:

determining for a given initial set of anchors (p1, ..., pm) having known positions and an area $\Omega$;

a dilution of precision for a position (p) in the area from the following expression $$g(p_i, p_j)(p) = \sqrt{\frac{2}{1 - \left(\frac{d_i^2 + d_j^2 - \|p_i - p_j\|^2}{2d_i d_j}\right)^2}},$$

where $p_i$ and $p_j$ are the positions of anchor pair i and j, and $d_i$ and $d_j$ are the distances from MN at p to the anchors i, j;

determining an optimal anchor pair from m anchors from the following expression $$g_m(p_1, \ldots, p_m)(p) = \min_{\substack{1 \le i,j \le m \\ i \ne j}} g(p_i, p_j)(p)$$

determining the average elevation of a least vulnerable tomography (LVT) from the following expression $$g_m(p_1, \ldots, p_m)(\Omega) = \frac{1}{|\Omega|} \int_\Omega g_m(p_1, \ldots, p_m)(x, y)\, dx\, dy$$

$$= \frac{1}{|\Omega|} \int_\Omega \min_{1 \le i,j \le m} g(p_i, p_j)(x, y)\, dx\, dy$$

where $|\Omega|$ refers to the area size, $g_m(p_1, \ldots, p_m)(\Omega)$ denote the average of $g_m(p_1, \ldots, p_m)(p)$ over $\Omega$ with respect to the m available anchors at $p_i$, i=1, ..., m; and outputting an indication of the LVT so determined.

2. A computer implemented method for determining geometric impact of anchor placement on localization accuracy of a mobile node (MN) over an arbitrary trajectory (F) within a wireless network, said method comprising the steps of:

determining for a given initial set of anchors (p1, ..., pm) having known positions a dilution of precision for a position (p) from the following expression $$g(p_i, p_j)(p) = \sqrt{\frac{2}{1 - \left(\frac{d_i^2 + d_j^2 - \|p_i - p_j\|^2}{2 d_i d_j}\right)^2}},$$

where $p_i$ and $p_j$ are the positions of anchor pair i and j, and $d_i$ and $d_j$ are the distances from MN at p to the anchors i, j;

determining an optimal anchor pair from m anchors from the following expression $$g_m(p_1, \ldots, p_m)(p) = \min_{\substack{1 \le i, j \le m \\ i \ne j}} g(p_i, p_j)(p)$$

determining the average elevation of a least vulnerable tomography (LVT) over the trajectory from the following expression $$g(p_i, p_j)(\Gamma) = \frac{\int_\Gamma g(p_i, p_j)(x, y) \, ds}{|\Gamma|}$$

where |Γ| refers to the length of Γ and ds is an arc length; and outputting an indication of the LVT so determined.

3. A computer implemented method for quantitatively comparing two anchor placements over a given area comprising the steps of:

for a given two placements p1, ..., pm and q1, ..., qn and an area Ω determining an average elevation of a least vulnerable tomography (LVT) formed by the anchor placements p1, ..., pm from the following $$g_m(p_1, \ldots, p_m)(\Omega)$$

determining an average elevation for an LVT formed by the anchor placements q1, ..., qn from the following $$g_n(q_1, \ldots, q_n)(\Omega)$$

determining which of the two anchor placements exhibit the better localization accuracy; and outputting an indication of the one exhibiting the better localization accuracy.

4. The computer implemented method of claim 3 wherein said determining which of the two anchor placements exhibit the better localization accuracy step further comprising the steps of:

comparing $g_m(p_1, \ldots, p_m)(\Omega)$ to $g_n(q_1, \ldots, q_n)(\Omega)$; and
determining if $g_n(q_1, \ldots, q_n)(\Omega) > g_m(p_1, \ldots, p_m)(\Omega)$
then the anchor placement p1, ..., pm is better with respect to localization accuracy, else the anchor placement q1, ..., qn is better.

5. A computer implemented method for quantitatively comparing two anchor placements over a given area comprising the steps of:

for a given two placements p1, ..., pm and q1, ..., qn and an area Γ determining an average elevation of a least vulnerable tomography (LVT) formed by the anchor placements p1, ..., pm from the following $$g_m(p_1, \ldots, p_m)(\Gamma)$$

determining an average elevation for an LVT formed by the anchor placements q1, ..., qn from the following $$g_n(q_1, \ldots, q_n)(\Gamma)$$

determining which of the two anchor placements exhibit the better localization accuracy; and outputting an indication of the one exhibiting the better localization accuracy.

6. The computer implemented method of claim 5 wherein said determining which of the two anchor placements exhibit the better localization accuracy step further comprising the steps of:

comparing $g_m(p_1, \ldots, p_m)(\Gamma)$ to $g_n(q_1, \ldots, q_n)(\Gamma)$; and
determining if $g_n(q_1, \ldots, q_n)(\Gamma) > g_m(p_1, \ldots, p_m)(\Gamma)$
then the anchor placement p1, ..., pm is better with respect to localization accuracy, else the anchor placement q1, ..., qn is better.

7. A computer implemented method for minimizing noise-induced impact on localization accuracy of a mobile node (MN) comprising the steps of:

selecting an optimal anchor pair, where $p_i$, $1 \le i \le m$ is a set of positions of anchors accessible to the MN at p and the optimal anchor pair from m anchors is defined by $$g_m(p_1, \ldots, p_m)(p) = \min_{\substack{1 \le i, j \le m \\ i \ne j}} g(p_i, p_j)(p)$$

where the function $g_m(p_1, \ldots, p_m)(p)$ refers to an anchor pair exhibiting a minimum geometric dilution of precision (GDOP) value among its alternatives;

determining one from two possible position realizations using a reference position derived from a Least Square Method (LSM) according to $$(A^T A) \begin{pmatrix} x^{(0)} \\ y^{(0)} \end{pmatrix} = A^T M, \text{ where}$$

$$A = 2 \begin{pmatrix} (x_2 - x_1) & (y_2 - y_1) \\ (x_3 - x_1) & (y_3 - y_1) \\ \ldots & \ldots \\ (x_m - x_1) & (y_m - y_1) \end{pmatrix},$$

$$M = \begin{pmatrix} \tilde{d}_1^2 - \tilde{d}_2^2 + r_2^2 - r_1^2 \\ \tilde{d}_1^2 - \tilde{d}_3^2 + r_3^2 - r_1^2 \\ \ldots \\ \tilde{d}_1^2 - \tilde{d}_m^2 + r_m^2 - r_1^2 \end{pmatrix},$$

where $A^T$ is the transpose of A, $(A^T A)^{-1}$ is the inverse of $(A^T A)$, and $r_i = \sqrt{x_i^2 + y_i^2}$, $1 \le i \le m$; and returning an indication of the anchor position.

* * * * *

UNITED STATES PATENT AND TRADEMARK OFFICE
CERTIFICATE OF CORRECTION

PATENT NO. : 8,577,362 B2
APPLICATION NO. : 13/253211
DATED : November 5, 2013
INVENTOR(S) : Ling et al.

It is certified that error appears in the above-identified patent and that said Letters Patent is hereby corrected as shown below:

In the Specification

In Column 1, Line 59, delete "$p_3$" and insert -- $p_3;$ --, therefor.

In Column 2, Line 23, delete "LSM; and" and insert -- LSM; --, therefor.

In Column 4, Line 7, delete "RRS" and insert -- RSS --, therefor.

In Column 7, Line 24, delete "$f((x^{(0)}, y^{(0)})$" and insert -- $f(x^{(0)}, y^{(0)})$ --, therefor.

In Column 8, Line 2, delete "$y^{(0)},$" and insert -- $y^{(0)}),$ --, therefor.

In Column 8, Line 29, delete "(see FIG. 1))." and insert -- (see FIG. 1). --, therefor.

In Column 9, Line 54, in Equation (9), delete "$\sqrt{tr((\hat{h}^T\mathbf{h})^{-1})},$" and insert -- $\sqrt{tr((\hat{h}^T\hat{h})^{-1})},$ --, therefor.

In Column 10, Line 46, delete "$\sqrt{2}\sigma_{d^*}$" and insert -- $\sqrt{2}\cdot\sigma_{d^*}$ --, therefor.

In Column 11, Line 62, delete "emit" and insert -- unit --, therefor.

In Column 12, Line 15, in Equation (16), delete "$=\tilde{d}_j 2$" and insert -- $=\tilde{d}_j^{\,2}$ --, therefor.

In Column 12, Lines 41-42, delete "Since are" and insert -- Since $p_*$, $p_{**}$ are --, therefor.

Signed and Sealed this
Seventh Day of April, 2015

Michelle K. Lee
*Director of the United States Patent and Trademark Office*

CERTIFICATE OF CORRECTION (continued)
U.S. Pat. No. 8,577,362 B2

In Column 17, Line 25, delete "TLPM." and insert -- TPLM. --, therefor.

In Column 19, Line 44, delete "F2" and insert -- $\Gamma_2$ --, therefor.

In the Claims

In Column 21, Line 3, in Claim 2, delete "(F)" and insert -- ($\Gamma$) --, therefor.